US012352950B2

(12) United States Patent
Tabayashi et al.

(10) Patent No.: US 12,352,950 B2
(45) Date of Patent: Jul. 8, 2025

(54) PHOSPHOR WHEEL, LIGHT SOURCE APPARATUS, AND PROJECTOR

(71) Applicant: SEIKO EPSON CORPORATION, Tokyo (JP)

(72) Inventors: Kosuke Tabayashi, Azumino (JP); Norikazu Kadotani, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 381 days.

(21) Appl. No.: 17/959,848

(22) Filed: Oct. 4, 2022

(65) Prior Publication Data

US 2023/0103351 A1    Apr. 6, 2023

(30) Foreign Application Priority Data

Oct. 4, 2021  (JP) .................................. 2021-163300

(51) Int. Cl.
*G03B 21/20*    (2006.01)
*G02B 26/00*    (2006.01)
*G03B 21/16*    (2006.01)

(52) U.S. Cl.
CPC .......... *G02B 26/008* (2013.01); *G03B 21/16* (2013.01); *G03B 21/204* (2013.01); *G03B 21/2066* (2013.01)

(58) Field of Classification Search
CPC .. G03B 21/204; G03B 21/16; G03B 21/2066; G03B 21/2033; G03B 21/2073; G02B 26/008

USPC .......................................................... 353/31
See application file for complete search history.

(56) References Cited

U.S. PATENT DOCUMENTS

| | | | |
|---|---|---|---|
| 10,268,111 B2 * | 4/2019 | Ikeda .................. | G03B 21/204 |
| 2013/0027671 A1 | 1/2013 | Miyazaki | |
| 2017/0099467 A1 * | 4/2017 | Egawa ................. | H04N 9/3158 |
| 2018/0059403 A1 * | 3/2018 | Takamatsu .......... | G02B 26/008 |
| 2018/0136457 A1 * | 5/2018 | Chang ....................... | F21V 9/30 |
| 2019/0094671 A1 * | 3/2019 | Ikeo ..................... | G02B 26/008 |
| 2020/0310233 A1 * | 10/2020 | Kadotani ........... | H05K 7/20327 |

FOREIGN PATENT DOCUMENTS

| | | |
|---|---|---|
| JP | 2013-47793 A | 3/2013 |
| WO | WO2016/110888 A | 7/2016 |

* cited by examiner

*Primary Examiner* — Magda Cruz
(74) *Attorney, Agent, or Firm* — Dority & Manning, P.A.

(57) ABSTRACT

A phosphor wheel includes a wheel element including a disk-shaped substrate having a first surface and a second surface opposite from the first surface, an annular phosphor disposed at the first surface on a circle around the center of the substrate, and a plurality of fins disposed at the second surface and extending outward from the side facing the center of the substrate, and a balance corrector that corrects nonuniformity of the rotational balance of the wheel element, and the balance corrector includes a first balancer and a second balancer that is lighter than the first balancer.

11 Claims, 16 Drawing Sheets

PHOSPHOR WHEEL, LIGHT SOURCE APPARATUS, AND PROJECTOR

The present application is based on, and claims priority from JP Application Serial Number 2021-163300, filed Oct. 4, 2021, the disclosure of which is hereby incorporated by reference herein in its entirety.

BACKGROUND

1. Technical Field

The present disclosure relates to a phosphor wheel, a light source apparatus, and a projector.

2. Related Art

In recent years, solid-state light sources, such as semiconductor laser diodes, have been used as light sources as projectors have become more sophisticated. When a semiconductor laser diode is used, it is necessary to provide a wavelength converter having a phosphor layer that converts the light outputted from the semiconductor laser diode and belongs to a blue wavelength band into visible light. The wavelength converter has a configuration in which a ring-shaped phosphor layer is formed at the surface of a phosphor wheel rotationally driven by a motor. A pickup lens as a light collection system is disposed in the vicinity of the rotating plate so as to face the phosphor layer.

To achieve satisfactory rotational characteristics of the phosphor wheel, the rotational balance of the phosphor wheel is desirably adjusted in consideration of eccentricity and other factors of the phosphor wheel. For example, JP-A-2013-47793 discloses a phosphor wheel having undergone rotational balance adjustment. JP-A-2013-47793 describes that an adhesive is added to the rotating substrate to adjust the rotational balance.

In WO 2016/110888, the substrate is provided with a plate-shaped balancer. Fine adjustment of the position of the balancer is made to adjust the rotational balance.

The adjustment method described in JP-A-2013-47793 is effective when the amount of unbalance is small. When the amount of unbalance is large, a large amount of adhesive is added, so that the adjustment is not readily made. The adjustment method described in WO 2016/110888 allows the adjustment irrespective of how much the amount of unbalance is. Fine adjustment is, however, not readily made because it is difficult to precisely dispose the balancer at a location where the substrate is balanced. It has therefore been desired to provide a phosphor wheel having a structure that readily allows the adjustment irrespective of how much the amount of unbalance is.

SUMMARY

A phosphor wheel includes a wheel element including a disk-shaped substrate having a first surface and a second surface opposite from the first surface, an annular phosphor disposed at the first surface on a circle around a center of the substrate, and a plurality of fins disposed at the second surface and extending outward from the side facing the center of the substrate, and a balance corrector that corrects nonuniformity of rotational balance of the wheel element, and the balance corrector includes a first balancer and a second balancer that is lighter than the first balancer.

A light source apparatus includes the phosphor wheel described above, a motor that rotates the phosphor wheel, and an excitation light source that causes excitation light to be incident on the phosphor wheel.

A projector includes the light source apparatus described above, a light modulation device that modulates illumination light outputted from the light source apparatus into image light, and a projection system that projects the image light outputted from the light modulation device.

DESCRIPTION OF EXEMPLARY EMBODIMENTS

First Embodiment

In the present embodiment, characteristic examples of a projector and a phosphor wheel used in the projector will be described. The projector is a projection-type image display apparatus that displays color video images on a screen.

Figure 1:
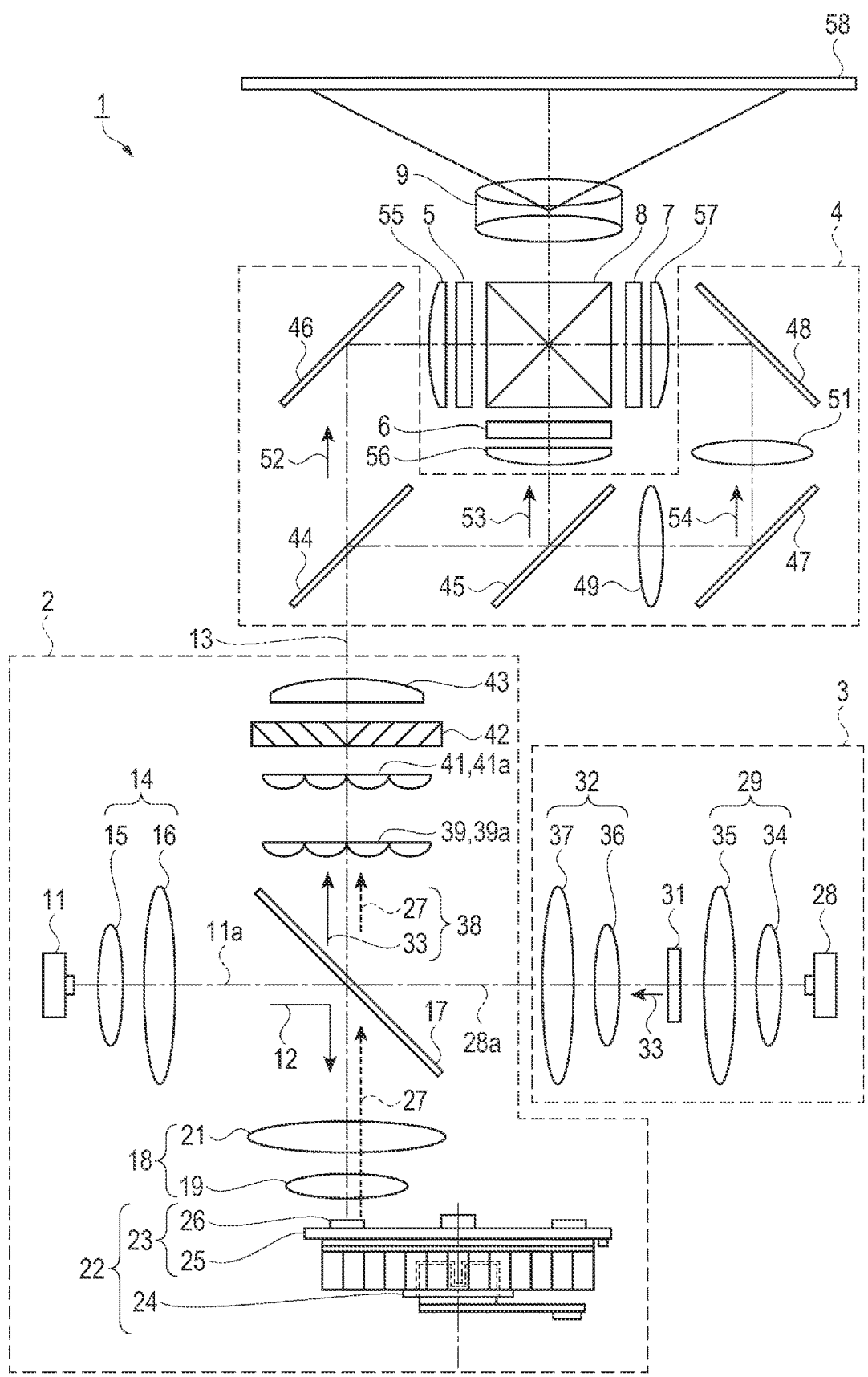
FIG. 1 is a configuration diagram showing an optical system of a projector according to a first embodiment.

A projector 1 includes a first illuminator 2, a second illuminator 3, and a color separation, light guide system 4, which serve as a light source apparatus, a red light modulator 5, a green light modulator 6, and a blue light modulator 7, which each serve as a light modulation device, a cross dichroic prism 8, and a projection system 9, as shown in FIG. 1. The red light modulator 5, the green light modulator 6, and the blue light modulator 7 are light modulation devices corresponding to red light, green light, and blue light, respectively.

The first illuminator 2 includes a first light source 11 as an excitation light source, a collimation system 14, a first dichroic mirror 17, a light collection system 18, a wavelength converter 22, a first lens array 39, a second lens array 41, a polarization converter 42, and a superimposing lens 43.

The first light source 11 includes a semiconductor laser. The first light source 11 outputs first blue light 12 as excitation light. The first blue light 12 is blue laser light, and the intensity of the outputted light peaks at a wavelength of about 445 nm. The wavelength of the first blue light 12 is not limited to 445 nm and may instead, for example, be 460 nm.

The optical axis of the first light source 11 is a first optical axis 11a. The optical axis of the first blue light 12 outputted by the first illuminator 2 is assumed to be an illumination optical axis 13. The first optical axis 11a is perpendicular to the illumination optical axis 13. The first blue light 12 outputted by the first light source 11 is radiated to the collimation system 14. The collimation system 14 includes a first lens 15 and a second lens 16. The collimation system 14 substantially parallelizes the first blue light 12. The first lens 15 and the second lens 16 are each formed of a convex lens.

The first blue light 12 passing through the collimation system 14 is radiated to the first dichroic mirror 17. The first dichroic mirror 17 intersects with the first optical axis 11a and the illumination optical axis 13 at an angle of 45°. The first dichroic mirror 17 reflects the first blue light 12 and transmits yellow fluorescence containing red light and green light.

The first blue light 12 reflected off the first dichroic mirror 17 is radiated to the light collection system 18. The light collection system 18 includes a third lens 19 and a fourth lens 21. The third lens 19 and the fourth lens 21 are each formed of a convex lens. The first blue light 12 passes through the light collection system 18 and is radiated to the wavelength converter 22.

The wavelength converter 22 includes a phosphor wheel 23 and a motor 24. The motor 24 rotates the phosphor wheel 23. The phosphor wheel 23 includes a disk-shaped circular plate 25. The circular plate 25 is provided with a phosphor 26. The first light source 11 causes the first blue light 12 to be incident on the phosphor wheel 23.

The first blue light 12 reflected off the first dichroic mirror 17 is collected by the light collection system 18, and is radiated to the phosphor 26. The first blue light 12 enters the wavelength converter 22. The phosphor 26 converts the first blue light 12 into yellow light 27 and emits the yellow light 27. The yellow light 27 emitted by the phosphor 26 is radiated to the light collection system 18. The light collection system 18 substantially parallelizes the yellow light 27. The first illuminator 2 includes the first light source 11, the light collection system 18, and the wavelength converter 22, as described above.

The light collection system 18 and the first dichroic mirror 17 are arranged along the illumination optical axis 13. The yellow light 27 passes through the light collection system 18 and the first dichroic mirror 17.

The second illuminator 3 is disposed on the right side of the first illuminator 2 in FIG. 1. The second illuminator 3 includes a second light source 28, a light collection system 29, a scatter plate 31, and a collimation system 32.

The second light source 28 includes a semiconductor laser identical to that of the first light source 11. The second light source 28 outputs second blue light 33. The optical axis of the second light source 28 is a second optical axis 28a. The second blue light 33 passes along the second optical axis 28a through the light collection system 29, the scatter plate 31, and the collimation system 32 in this order. The light collection system 29 collects the second blue light 33 in the vicinity of the scatter plate 31. The light collection system 29 includes a fifth lens 34 and a sixth lens 35. The fifth lens 34 and the sixth lens 35 are each formed of a convex lens.

The scatter plate 31 scatters the second blue light 33. The scatter plate 31 causes the second blue light 33 to have a light orientation distribution similar to that of the yellow light 27 outputted from the phosphor wheel 23. The scatter plate 31 is, for example, a ground glass plate made of optical glass.

The collimator system 32 substantially parallelizes the light from the scatter plate 31. The collimation system 32 includes a seventh lens 36 and an eighth lens 37. The seventh lens 36 and the eighth lens 37 are each formed of a convex lens.

The second blue light 33 passing through the collimation system 32 is reflected off the first dichroic mirror 17. The second blue light 33 is combined with the yellow light 27 having passed through the first dichroic mirror 17 into white light 38 as illumination light.

The first lens array 39, the second lens array 41, the polarization converter 42, and the superimposing lens 43 are arranged in this order along the illumination optical axis 13. The white light 38 as a result of the combination performed by the first dichroic mirror 17 passes through the first lens array 39, the second lens array 41, the polarization converter 42, and the superimposing lens 43 in this order.

The first lens array 39 divides the white light 38 into a plurality of sub-luminous fluxes. The first lens array 39 includes a plurality of first lenslets 39a. The plurality of first lenslets 39a are arranged in a matrix in a plane perpendicular to the illumination optical axis 13.

The second lens array 41 and the superimposing lens 43 bring images formed by the first lenslets 39a of the first lens array 39 into focus in the vicinity of an image formation region of each of the red light modulator 5, the green light modulator 6, and the blue light modulator 7. The second lens array 41 includes a plurality of second lenslets 41a. The plurality of second lenslets 41a are arranged in a matrix in a plane perpendicular to the illumination optical axis 13. The plurality of second lenslets 41a are arranged in correspondence with the plurality of first lenslets 39a.

The polarization converter 42 converts the divided sub-luminous fluxes from the first lens array 39 into linearly polarized luminous fluxes. The polarization converter 42 includes polarization separation layers, reflection layers, and retardation films.

The superimposing lens 43 collects the sub-luminous fluxes from the polarization converter 42 and superimposes the collected sub-luminous fluxes on one another in the vicinity of the image formation region of each of the red light modulator 5, the green light modulator 6, and the blue light modulator 7. The first lens array 39, the second lens array 41, and the superimposing lens 43 form an optical integration system that homogenizes the in-plane optical intensity distribution of the white light 38. The white light 38 having passed through the superimposing lens 43 is inputted to the color separation, light guide system 4.

The color separation, light guide system 4 includes a second dichroic mirror 44, a third dichroic mirror 45, a first reflection mirror 46, a second reflection mirror 47, a third reflection mirror 48, a first relay lens 49, and a second relay lens 51. The white light 38 outputted from the first illuminator 2 and the second illuminator 3 is separated by the color separation, light guide system 4 into red light 52, green light 53, and third blue light 54, which each serve as the illumination light. The color separation, light guide system 4 guides the red light 52 to the red light modulator 5, the green light 53 to the green light modulator 6, and the third blue light 54 to the blue light modulator 7.

A first field lens 55 is disposed between the color separation, light guide system 4 and the red light modulator 5. A second field lens 56 is disposed between the color separation, light guide system 4 and the green light modulator 6. A third field lens 57 is disposed between the color separation, light guide system 4 and the blue light modulator 7.

The second dichroic mirror 44 is a dichroic mirror that transmits the red light 52 and reflects the green light 53 and the third blue light 54. The third dichroic mirror 45 is a dichroic mirror that reflects the green light 53 and transmits the third blue light 54. The first reflection mirror 46 is a reflection mirror that reflects the red light 52. The second reflection mirror 47 and the third reflection mirror 48 are reflection mirrors that reflect the third blue light 54.

The red light 52 having passed through the second dichroic mirror 44 is reflected off the first reflection mirror 46, passes through the first field lens 55, and is incident on the image formation region of the red light modulator 5 for the red light 52.

The green light 53 reflected off the second dichroic mirror 44 is further reflected off the third dichroic mirror 45, passes through the second field lens 56, and is incident on the image formation region of the green light modulator 6 for the green light 53.

The third blue light 54 reflected off the second dichroic mirror 44 passes through the third dichroic mirror 45. The third blue light 54 having passed through the third dichroic mirror 45 travels via the first relay lens 49, the second reflection mirror 47, the second relay lens 51, the light-exiting-side third reflection mirror 48, and the third field lens 57 and is incident on the image formation region of the blue light modulator 7 for the third blue light 54.

The red light modulator 5, the green light modulator 6, and the blue light modulator 7 each modulate the color light incident thereon in accordance with image information to form image light corresponding to the color light. In other words, the red light modulator 5 modulates the red light 52 contained in the yellow light 27 outputted from the first illuminator 2 into image light. The green light modulator 6 modulates the green light 53 contained in the yellow light 27 outputted from the first illuminator 2 into image light. The blue light modulator 7 modulates the third blue light 54 contained in the second blue light 33 outputted from the second illuminator 3 into image light. The image light is light having a luminance distribution in the form of an image.

Although not shown, a light-incident-side polarizer is disposed between the first field lens 55 and the red light modulator 5. A light-exiting-side polarizer is disposed between the red light modulator 5 and the cross dichroic prism 8. Similarly, a light-incident-side polarizer is disposed between the second field lens 56 and the green light modulator 6. A light-exiting-side polarizer is disposed between the green light modulator 6 and the cross dichroic prism 8. A light-incident-side polarizer is disposed between the third field lens 57 and the blue light modulator 7. A light-exiting-side polarizer is disposed between the blue light modulator 7 and the cross dichroic prism 8.

The cross dichroic prism 8 is an optical element that combines the image light outputted from the red light modulator 5, the image light outputted from the green light modulator 6, and the image light outputted from the blue light modulator 7 with one another to form a color image. The cross dichroic prism 8 is formed of four right-angled prisms bonded to each other and has a substantially square shape in a plan view. Dielectric multilayer films are formed along the substantially X-letter-shaped interfaces between the right-angled prisms bonded to each other.

The red image light travels from the red light modulator 5 to the cross dichroic prism 8. The green image light travels from the green light modulator 6 to the cross dichroic prism 8. The blue image light travels from the blue light modulator 7 to the cross dichroic prism 8. The red image light, the green image light, and the blue image light are combined with one another by the cross dichroic prism 8 to form color image light.

The color image light having exited out of the cross dichroic prism 8 is magnified and projected onto a screen 58 by the projection system 9. The projection system 9 projects the image light outputted from the red light modulator 5, the green light modulator 6, and the blue light modulator 7. A color image is formed on the screen 58.

The projector 1 includes the first illuminator 2, the second illuminator 3, the red light modulator 5, the green light modulator 6, the blue light modulator 7, and the projection system 9, as described above.

Figure 2:
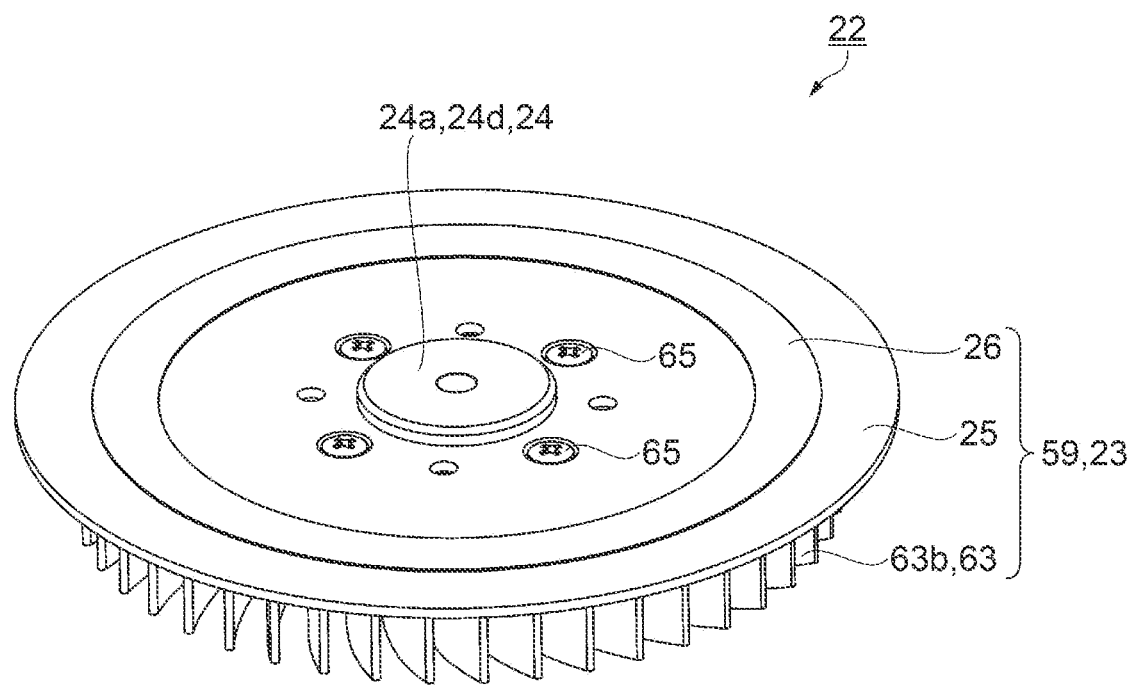
FIG. 2 is a schematic perspective view showing the configuration of a phosphor wheel.
Figure 3:
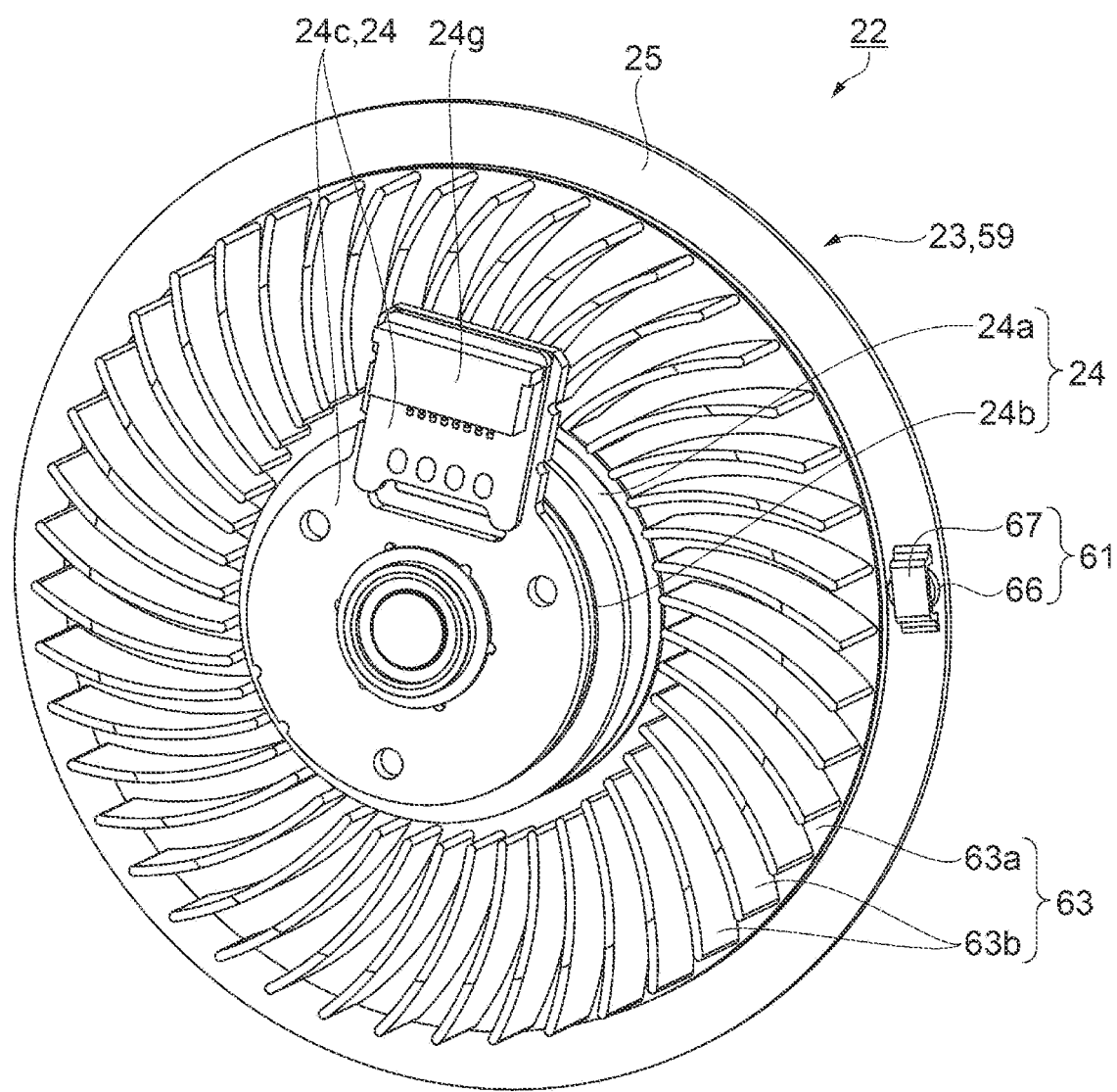
FIG. 3 is a schematic perspective view showing the configuration of the phosphor wheel.
Figure 4:
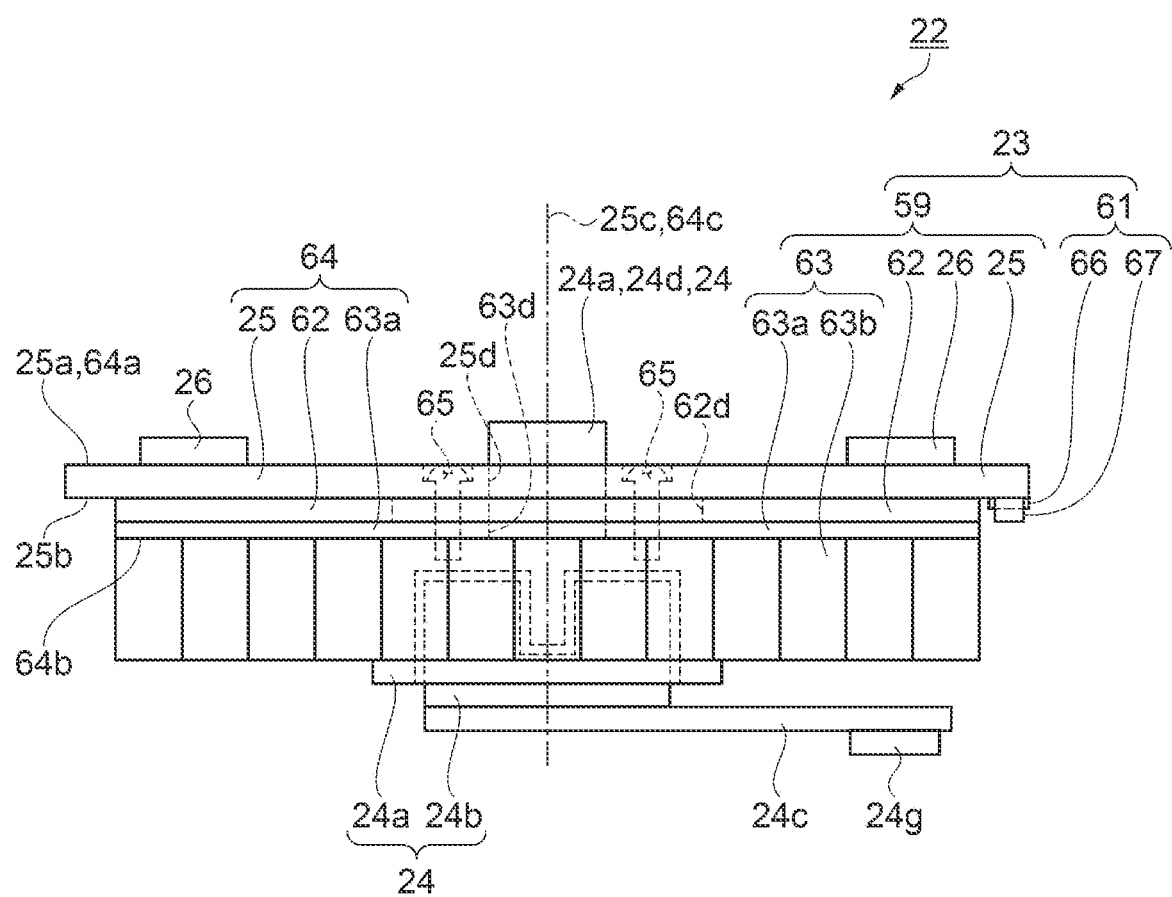
FIG. 4 is a diagrammatic side view showing the configuration of the phosphor wheel.
Figure 5:
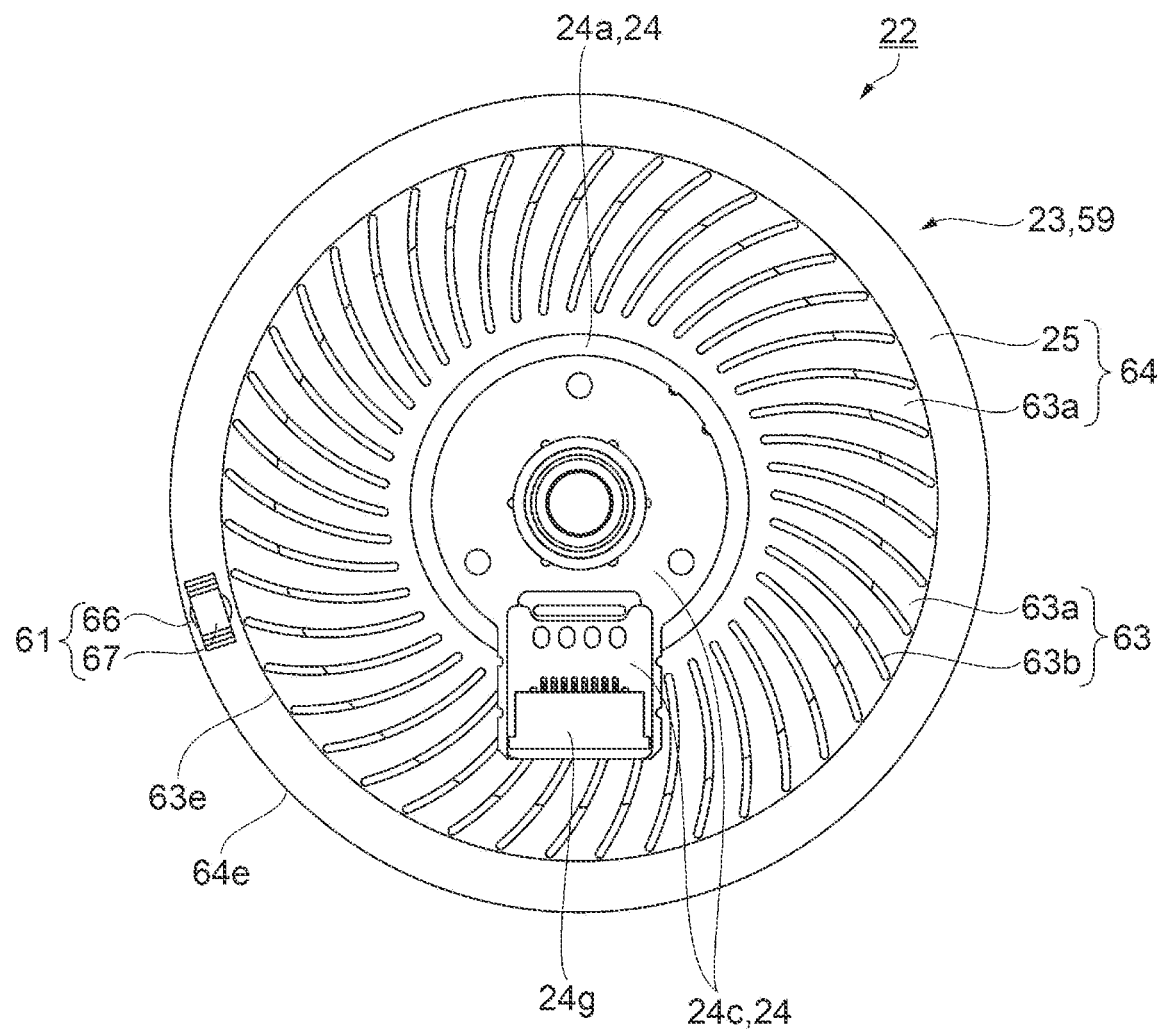
FIG. 5 is a diagrammatic bottom view showing the configuration of the phosphor wheel.

FIG. 2 shows the wavelength converter 22 viewed from the side facing the phosphor 26. FIGS. 3 and 5 show the wavelength converter 22 viewed from the side facing the motor 24. FIG. 4 shows the wavelength converter 22 viewed from the side facing the side surface thereof. The wavelength converter 22 includes the motor 24 and the phosphor wheel 23, as shown in FIGS. 2 to 5. The phosphor wheel 23 includes a wheel element 59 and a balance corrector 61. The balance corrector 61 corrects nonuniformity of the rotational balance of the wheel element 59. The wheel element 59 includes the circular plate 25, the phosphor 26, a vapor chamber 62, and a vane wheel 63.

The circular plate 25 has the shape of a disk and has a first surface 25*a* and a second surface 25*b* opposite from the first surface 25*a*. The phosphor 26 is disposed at the first surface 25*a* of the circular plate 25. The phosphor 26 is disposed on a circle around a center 25*c* of the circular plate 25. The phosphor 26 has an annular shape and is provided along the circumferential direction of the first surface 25*a*.

The phosphor wheel 23 outputs the yellow light 27 toward the side on which the first blue light 12 is incident. The circular plate 25 is, for example, made of metal that excels in heat dissipation, such as aluminum and copper.

The phosphor 26 is excited by the first blue light 12 and emits the yellow light 27, which belongs to a second wavelength band. The surface via which the first blue light 12 enters the phosphor 26 is also the light exiting surface via which the yellow light 27 exits. The yellow light 27 is yellow light containing the red light 52 and the green light 53. The phosphor 26 contains, for example, $(Y, Gd)_3(Al, Ga) 5012$: Ce, which is a YAG-based phosphor.

The first blue light 12 formed of laser light enters the phosphor 26 and therefore generates heat in the phosphor 26. The motor 24 rotates the circular plate 25, so that the position on the phosphor 26 where the first blue light 12 is incident successively changes. Since the same portion of the phosphor 26 is not intensively irradiated with the first blue light 12, deterioration of the phosphor 26 is prevented. The pattern of the phosphor 26 may be a discontinuous pattern in place of a pattern continuous all the way around.

The vapor chamber 62 is disposed between the circular plate 25 and the vane wheel 63. The vapor chamber 62 efficiently conducts the heat from the circular plate 25 to the vane wheel 63.

The vane wheel 63 includes a fixing plate 63a and a plurality of fins 63b. The plurality of fins 63b are fixed to the fixing plate 63a. The vane wheel 63 is also called an impeller. The fins 63b indicate the vanes of the vane wheel 63. The type of the vane wheel 63 is not limited to a specific type, and the vane wheel 63 is, for example, a centrifugal blower in the present embodiment.

The circular plate 25, the vapor chamber 62, and the fixing plate 63a are stacked in this order, and glued and fixed together. The circular plate 25, the vapor chamber 62, and the fixing plate 63a form a substrate 64. The substrate 64 therefore includes the vapor chamber 62. The substrate 64 has the shape of a disk and has a first surface 64a and a second surface 64b opposite from the first surface 64a. A center 64c of the substrate 64 coincides with the center 25c of the circular plate 25. The phosphor 26 is disposed at the first surface 64a of the substrate 64. The annular phosphor 26 is disposed in the form of a circle around the center 64c of the substrate 64. The plurality of fins 63b are disposed at the second surface 64b of the substrate 64. The plurality of fins 63b extend outward from the side facing the center of the substrate 64. The wheel element 59 includes the substrate 64, the phosphor 26, and the fins 63b.

The motor 24 includes a rotor 24a and a stator 24b. The stator 24b includes a coil. The rotor 24a includes a permanent magnet. The rotor 24a is rotatably coupled to the stator 24b via a bearing placed therein. Application of an AC voltage to the coil causes the magnetic field to rotate, and the rotor 24a rotates in response to the rotating magnetic field. In the motor 24, the rotor 24a rotates relative to the stator 24b. The motor 24 is an AC motor. The stator 24b is provided with a wiring substrate 24c. The wiring substrate 24c is provided with a coupling terminal 24g electrically coupled to the coil.

The rotor 24a includes a rotary shaft 24d. The rotor 24a has a cylindrical shape in the vicinity of the vane wheel 63. The axis of the rotor 24a coincides with the axis of the rotary shaft 24d. The motor 24 rotates the rotor 24a. The rotor 24a is fixed to the circular plate 25. The motor 24 rotates the phosphor wheel 23.

The circular plate 25 has a first central through hole 25d at the center 25c. The vapor chamber 62 has a second central through hole 62d at the center thereof. The fixing plate 63a has a third through hole 63d at the center thereof. The rotary shaft 24d is inserted into the first central through hole 25d, the second central through hole 62d, and the third through hole 63d. There is a small gap between the outer diameter of the rotary shaft 24d and the inner diameter of the first central through hole 25d, so that the rotary shaft 24d fits into the first central through hole 25d. The circular plate 25, the vapor chamber 62, and the fixing plate 63a of the substrate 64 are fixed to the rotor 24a with screws 65.

Figure 6:
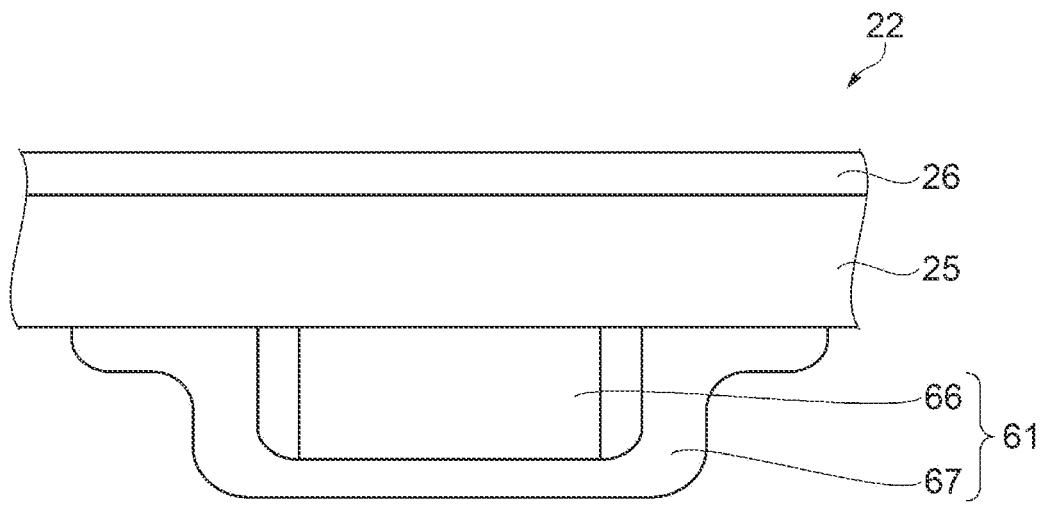
FIG. 6 is a diagrammatic side view showing the configuration of first and second balancers.

The balance corrector 61 is placed at the second surface 25b of the circular plate 25, which forms the substrate 64. The balance corrector 61 includes a first balancer 66 and a second balancer 67, which is lighter than the first balancer 66, as shown in FIG. 6. The first balancer 66 and the second balancer 67 are layered on each other. The first balancer 66 preferably has a circular columnar or arcuate shape. When a cylindrical shape is employed, the first balancer 66 can be readily machined on a lathe machine. When an arcuate shape is employed, the first balancer 66 can be readily placed between the vane wheel 63 and the outer circumference of the circular plate 25. The bonding area across which the first balancer 66 and the circular plate 25 are bonded to each other can be increased.

The first balancer 66 and the second balancer 67 of the balance corrector 61 are disposed between an outer circumference 64e of the substrate 64 and an outer circumference 63e of the plurality of fins 63b.

Figure 7:
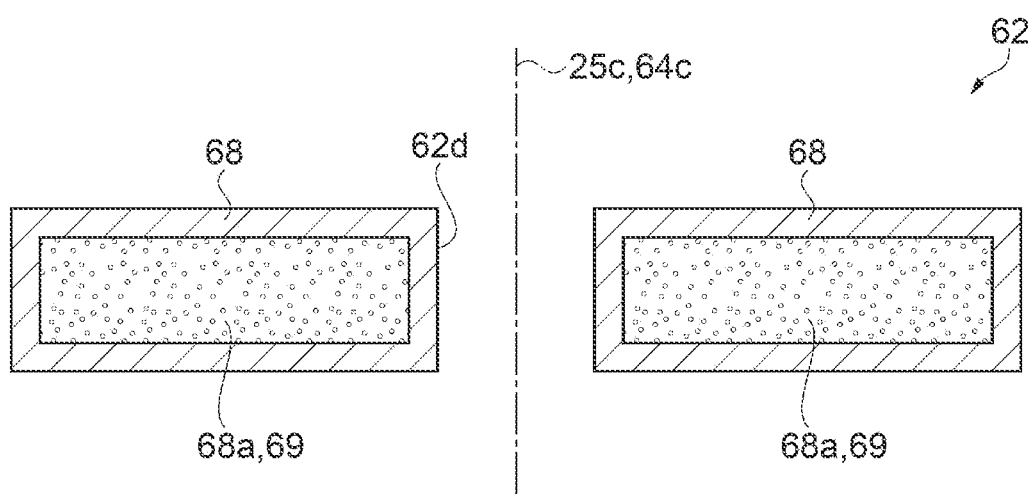
FIG. 7 is a diagrammatic side cross-sectional view showing the configuration of a vapor chamber.

The vapor chamber 62 includes a container section 68 having an cavity 68a provided therein, as shown in FIG. 7. The container section 68 has the shape of a disk and has the second central through hole 62d at the center thereof. The cavity 68a encapsulates an operating fluid 69. The operating fluid 69 vaporizes from the liquid phase to the gas phase due to the heat generated by the phosphor 26 and condenses from the gas phase to the liquid phase due to the dissipation of the heat via the fins 63b. The container section 68 is preferably made of a material having satisfactory heat conductivity. The material of the container section 68 is not limited to a specific material and is, for example, copper or copper alloy in the present embodiment. The operating fluid 69 is preferably made of a material that vaporizes due to the heat generated by the phosphor 26. The material of the operating fluid 69 is not limited to a specific material and is, for example, pure water in the present embodiment.

According to the configuration described above, the heat generated by the phosphor 26 is received by the vapor chamber 62 via the circular plate 25, and the heat vaporizes the operating fluid 69 in the vapor chamber 62, so that the heat diffuses in the vapor chamber 62. The diffused heat is dissipated via the fins 63b, so that the operating fluid 69 condenses, whereby the cooling efficiency at which the entire fins 63b dissipate the heat can be increased.

Figure 8:
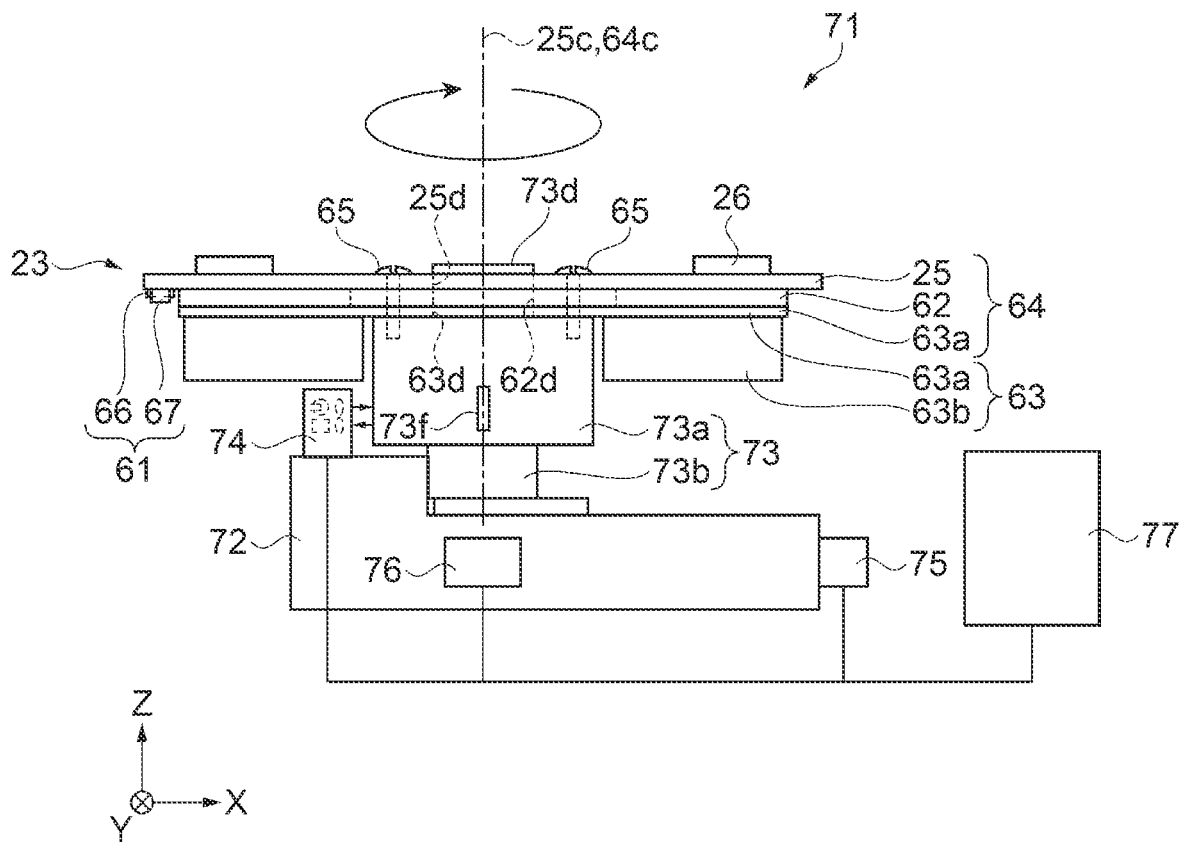
FIG. 8 is a diagrammatic side view showing the configuration of a balance adjuster.

FIG. 8 shows part of a balance adjuster 71, which adjusts the balance of the phosphor wheel 23. The direction toward the right side in FIG. 8 is assumed to be a direction +X. The direction toward the upper side in FIG. 8 is assumed to be a direction +Z. The direction perpendicular to the directions X and Z is assumed to be a direction Y.

The balance adjuster 71 includes a base 72. A motor 73 for detection and a rotation detector 74 are disposed at the base 72. A first acceleration sensor 75 is disposed at the +X-direction-side side surface of the base 72. A second acceleration sensor 76 is disposed at the −Y-direction-side side surface of the base 72.

The balance adjuster 71 includes a controller 77. The controller 77 controls the operation of the balance adjuster 71. The controller 77 is electrically coupled to the rotation detector 74, the first acceleration sensor 75, the second acceleration sensor 76, and the motor 73 for detection.

The motor 73 for detection includes a rotor 73a and a stator 73b. The stator 73b is fixed to the base 72. The rotor 73a rotates relative to the stator 73b. The rotor 73a includes a rotary shaft 73d. To adjust the phosphor wheel 23, the rotary shaft 73d is inserted into the first central through hole 25d, the second central through hole 62d, and the third through hole 63d of the substrate 64. The substrate 64 is fixed to the rotor 73a with the screws 65.

The rotation detector 74 detects the rotation of the rotor 73a. A mark 73f is disposed at the side surface of the rotor 73a. The rotation detector 74 includes a light source, which radiates light to the rotor 73a. The rotation detector 74 includes a photosensor, which measures changes in luminance of the light reflected off the side surface of the rotor 73a. When the mark 73f passes the location facing the rotation detector 74, the luminance of the reflected light detected by the photosensor changes. The rotation detector 74 detects the timing when the mark 73f passes the location facing the rotation detector 74 based on the change in luminance of the reflected light. The motor 73 for detection rotates the rotor 73a at a constant speed. The controller 77 recognizes the angle of rotation of the rotor 73a by detecting the timing when the mark 73f passes the location facing the rotation detector 74.

The first acceleration sensor 75 detects acceleration acting on the base 72 in the directions +X and −X. The second acceleration sensor 76 detects acceleration acting on the base 72 in the directions +Y and −Y. When the rotating phosphor wheel 23 is unbalanced in rotation, acceleration acts on the base 72 as the rotor 73a rotates. The first acceleration sensor 75 and the second acceleration sensor 76 detect acceleration acting on the base 72.

The controller 77 outputs a drive signal to the motor 73 for detection to rotate the rotor 73a. The rotation detector 74 detects the timing when the mark 73f passes the location facing the rotation detector 74. The first acceleration sensor 75 and the second acceleration sensor 76 detect acceleration acting on the base 72. The controller 77 measures the amount of unbalance of the phosphor wheel 23 based on the acceleration that acts on the base 72 and varies in correspondence with the position of the mark 73f. When the amount of unbalance is large, the phosphor wheel 23 greatly wobbles. The controller 77 computes the positions and sizes of the first balancer 66 and the second balancer 67 to be placed at the circular plate 25.

Figure 9:
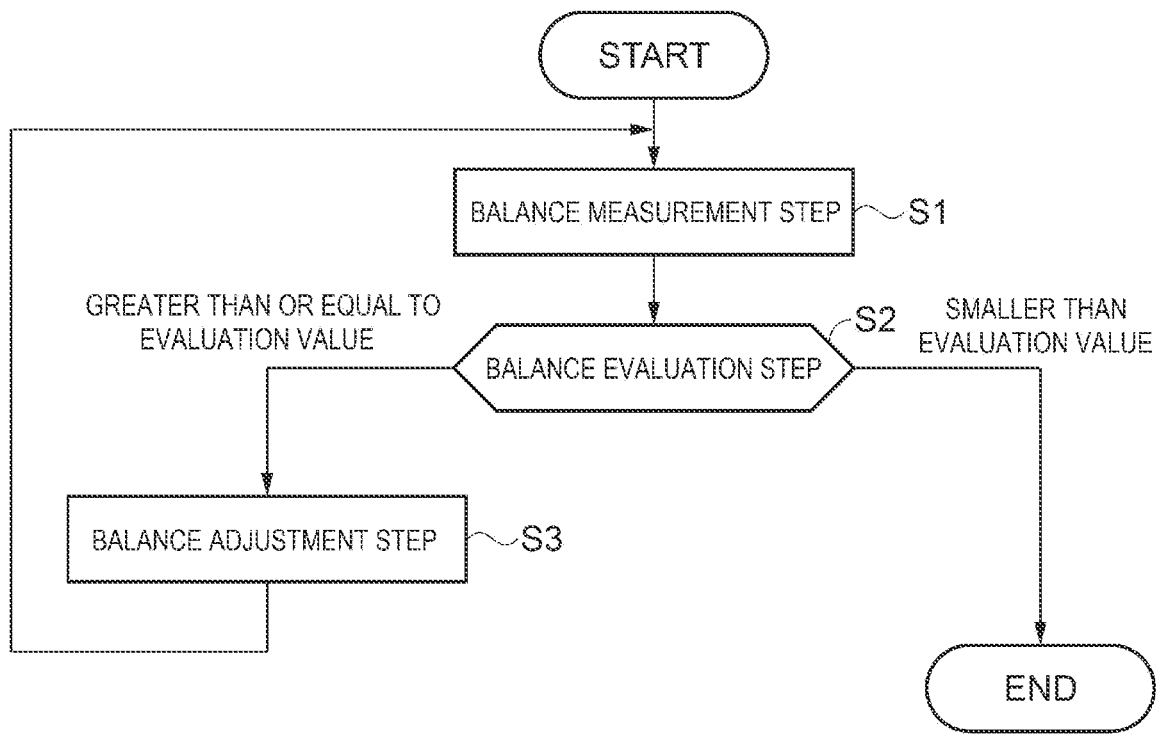
FIG. 9 is a flowchart of a balance adjustment method.

A method for adjusting the rotational balance of the phosphor wheel 23 described above will next be described. In the flowchart of FIG. 9, step S1 corresponds to a balance measurement step. An operator places the phosphor wheel 23 in the balance adjuster 71. The controller 77 causes the motor 73 for detection to rotate the phosphor wheel 23. The controller 77 measures the amount of unbalance of the phosphor wheel 23. The controller 77 computes the positions and sizes of the first balancer 66 and the second balancer 67 to be placed at the circular plate 25. The controller 77 then transitions to step S2.

Step S2 corresponds to a balance evaluation process. The controller 77 includes a storage. The storage stores an evaluation value used to evaluate the rotational balance. The controller 77 compares the measured amount of unbalance with the evaluation value. When the measured amount of unbalance is greater than or equal to the evaluation value, the controller 77 transitions to the next step S3. When the measured amount of unbalance is smaller than the evaluation value, the adjustment of the rotational balance is completed.

Step S3 corresponds to a balance adjustment step. As each of the first balancer 66 and the second balancer 67, a plurality of types of balancer is prepared. The operator glues and fixes a first balancer 66 and a second balancer 67 according to the results computed by the controller 77 to the circular plate 25. The controller 77 then transitions to step S1. When the amount of unbalance measured in steps S1 and S2 is smaller than the evaluation value, the adjustment of the rotational balance is completed. When the adjustment can be made accurately in step S3, the method may be terminated after the adjustment.

When the measured amount of unbalance is large, only the first balancer 66 may be placed in step S3, which is the balance adjustment step. Thereafter, when the amount of unbalance is small in step S1, which is the balance measurement step, the second balancer 67 may be used for fine adjustment of the amount of unbalance.

According to the configuration described above, the two types of balancers having different weights are used. The first balancer 66, which is heavier, achieves roughly balanced rotation. The second balancer 67, which is lighter, is then used to make fine adjustment of the rotational balance. When the amount of unbalance is large, the first balancer 66 can reduce the amount of unbalance. When the amount of unbalance is small, the second balancer 67 can make fine adjustment of the rotational balance. The amount of unbalance can therefore be readily adjusted irrespective of how much the amount of unbalance is.

According to the configuration described above, the first balancer 66 and the second balancer 67 are disposed on the side facing the outer circumference of the substrate 64. The arrangement described above allows the adjustment to be made by using smaller weight than that used when the first balancer 66 and the second balancer 67 are disposed on the side facing the center 64c of the substrate 64. An increase in the weight of the phosphor wheel 23 can therefore be suppressed.

According to the configuration described above, the first balancer 66 and the second balancer 67 can be disposed at the same location. Weights can be disposed at a location where it is desired to eliminate rotational unbalance, whereby the adjustment can be readily made.

According to the configuration described above, the first illuminator 2 includes the phosphor wheel 23 described above. The phosphor wheel 23 described above can be readily adjusted irrespective of how much the amount of unbalance is. The first illuminator 2 can therefore be an illuminator including the phosphor wheel 23 that can be readily adjusted irrespective of how much the amount of unbalance is.

According to the configuration described above, the projector 1 includes the phosphor wheel 23 described above. The phosphor wheel 23 described above can be readily adjusted irrespective of how much the amount of unbalance is. The projector 1 can therefore be a projector including the phosphor wheel 23 that can be readily adjusted irrespective of how much the amount of unbalance is.

Second Embodiment

The present embodiment differs from the first embodiment in terms of the location where the first balancer 66 is placed. The same configurations as those in the first embodiment have the same reference characters, and no redundant description of the same configurations will be made.

Figure 10:
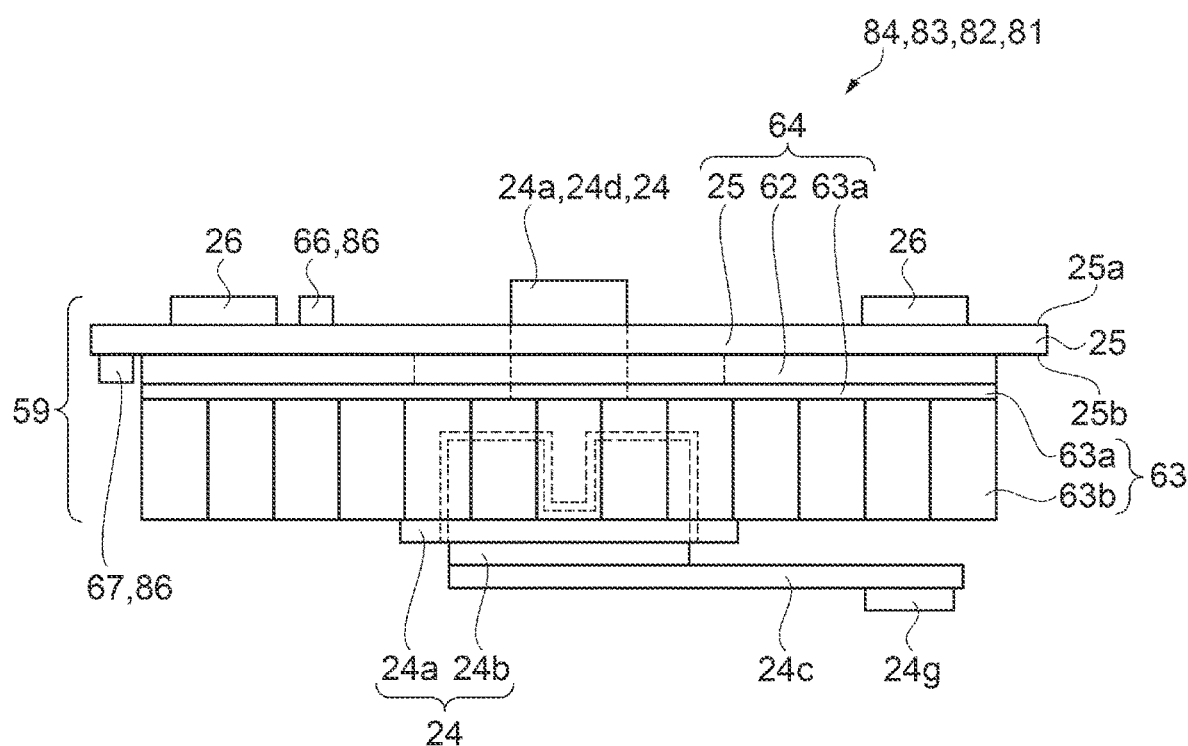
FIG. 10 is a diagrammatic side view showing the configuration of the phosphor wheel according to a second embodiment.

A wavelength converter 83 of a first illuminator 82 of a projector 81 includes a phosphor wheel 84, as shown in FIG. 10. The phosphor wheel 84 includes the wheel element 59, a balance corrector 86, and the motor 24. The balance corrector 86 includes the first balancer 66 and the second balancer 67. The first balancer 66 is disposed at the first surface 25a. The second balancer 67 is disposed at the second surface 25b. The first balancer 66 is disposed on the inner side with respect to the phosphor 26. The term "inner side" is the side closer to the rotary shaft 24d. The second balancer 67 is disposed on the outer side with respect to the phosphor 26.

According to the configuration described above, the first balancer 66, which is heavier, is disposed on the inner side. The second balancer 67, which is lighter, is disposed on the outer side. The first balancer 66, which has a larger effect on the rotational balance, has a reduced effect. The second balancer 67, which has a smaller effect on the rotational balance, has an increased effect. The coarse adjustment using the first balancer 66 and the fine adjustment using the second balancer 67 can therefore both be readily made.

Third Embodiment

The present embodiment differs from the second embodiment in that the second balancer 67 is placed at the first surface 25a. The same configurations as those in the second embodiment have the same reference characters, and no redundant description of the same configurations will be made.

Figure 11:
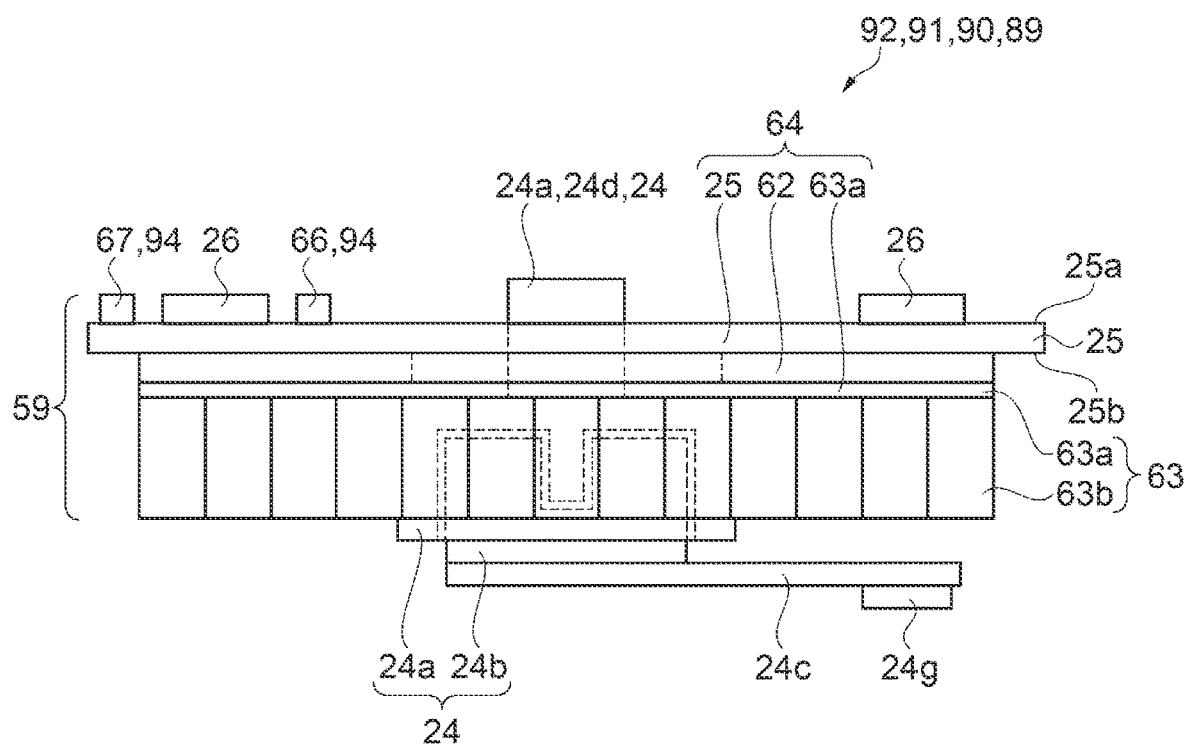
FIG. 11 is a diagrammatic side view showing the configuration of the phosphor wheel according to a third embodiment.

A wavelength converter 91 of a first illuminator 90 of a projector 89 includes a phosphor wheel 92, as shown in FIG. 11. The phosphor wheel 92 includes the wheel element 59, a balance corrector 94, and the motor 24. The balance corrector 94 includes the first balancer 66 and the second balancer 67. The first balancer 66 is disposed at the first surface 25a. The second balancer 67 is also disposed at the first surface 25a. The first balancer 66 is disposed on the inner side with respect to the phosphor 26. The second balancer 67 is disposed on the outer side with respect to the phosphor 26.

According to the configuration described above, the first balancer 66, which is heavier, is disposed on the inner side. The second balancer 67, which is lighter, is disposed on the outer side. The first balancer 66, which has a larger effect on the rotational balance, has a reduced effect. The second balancer 67, which has a smaller effect on the rotational balance, has an increased effect. The coarse adjustment using the first balancer 66 and the fine adjustment using the second balancer 67 can therefore both be readily made.

Fourth Embodiment

The present embodiment differs from the third embodiment in that the first balancer 66 is placed at the rotor of the motor. The same configurations as those in the first embodiment have the same reference characters, and no redundant description of the same configurations will be made.

Figure 12:
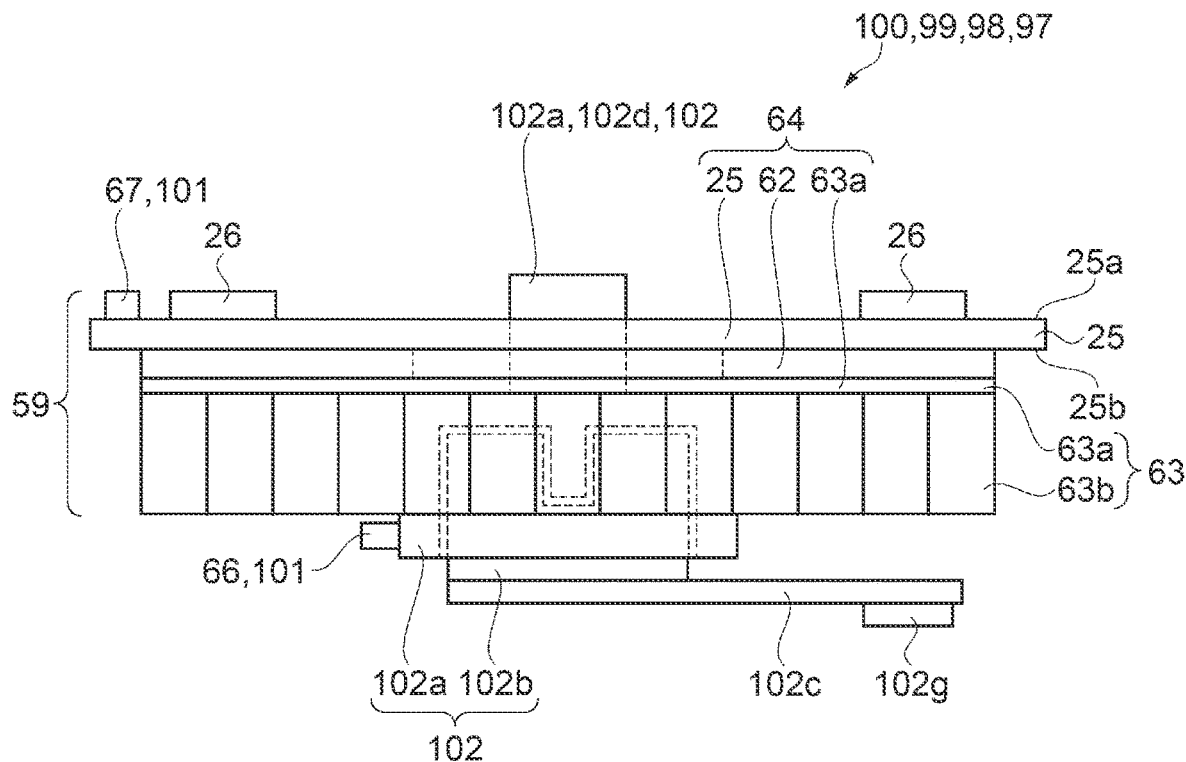
FIG. 12 is a diagrammatic side view showing the configuration of the phosphor wheel according to a fourth embodiment.

A wavelength converter 99 of a first illuminator 98 of a projector 97 includes a phosphor wheel 100, as shown in FIG. 12. The phosphor wheel 100 includes the wheel element 59, a balance corrector 101, and a motor 102. The motor 102 includes a rotor 102a, a stator 102b, a substrate 102c, a rotary shaft 102d, and a coupling terminal 102g. The rotor 102a is axially longer than the rotor 24a in the third embodiment. The balance corrector 101 includes the first balancer 66 and the second balancer 67. The first balancer 66 is disposed at the outer circumferential surface of the rotor 102a. The second balancer 67 is disposed at the first surface 25a. The first balancer 66 is disposed on the inner side with respect to the phosphor 26. The second balancer 67 is disposed on the outer side with respect to the phosphor 26.

According to the configuration described above, the first balancer 66, which is heavier, is disposed on the inner side. The second balancer 67, which is lighter, is disposed on the outer side. The first balancer 66, which has a larger effect on the rotational balance, has a reduced effect. The second balancer 67, which has a smaller effect on the rotational balance, has an increased effect. The coarse adjustment using the first balancer 66 and the fine adjustment using the second balancer 67 can therefore both be readily made.

Fifth Embodiment

The present embodiment differs from the second embodiment in that the first balancer 66 and the second balancer 67 are differently disposed. The same configurations as those in the second embodiment have the same reference characters, and no redundant description of the same configurations will be made.

Figure 13:
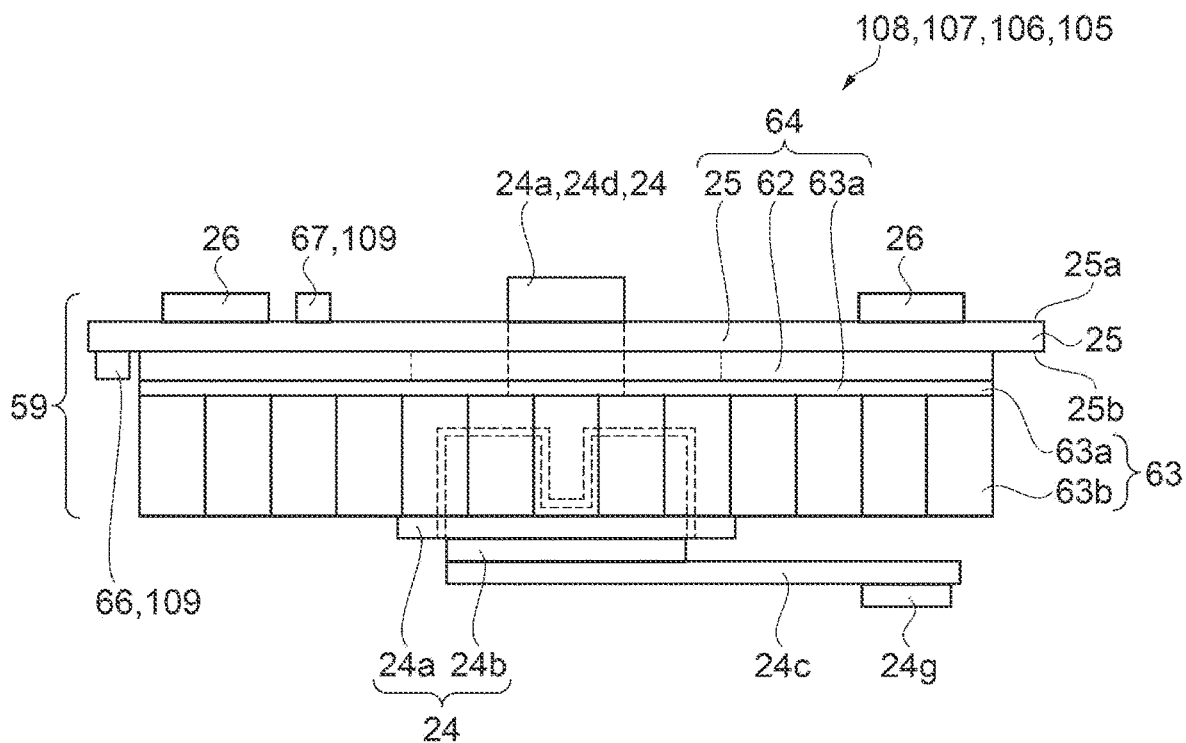
FIG. 13 is a diagrammatic side view showing the configuration of the phosphor wheel according to a fifth embodiment.

A wavelength converter 107 of a first illuminator 106 of a projector 105 includes a phosphor wheel 108, as shown in FIG. 13. The phosphor wheel 108 includes the wheel element 59, a balance corrector 109, and the motor 24. The balance corrector 109 includes the first balancer 66 and the second balancer 67. The first balancer 66 is disposed at the second surface 25b. The second balancer 67 is disposed at the first surface 25a. The first balancer 66 is disposed on the outer side with respect to the phosphor 26. The second balancer 67 is disposed on the inner side with respect to the phosphor 26.

According to the configuration described above, since the first balancer 66, which is heavier, is disposed on the outer side, the weight of the first balancer 66 can be reduced. Since the second balancer 67 is disposed on the inner side, the accuracy of the fine adjustment can be increased. The balance of the phosphor wheel 108 can therefore be precisely adjusted with an increase in the weight thereof suppressed.

Sixth Embodiment

The present embodiment differs from the third embodiment in that the first balancer 66 and the second balancer 67 are differently disposed. The same configurations as those in the third embodiment have the same reference characters, and no redundant description of the same configurations will be made.

Figure 14:
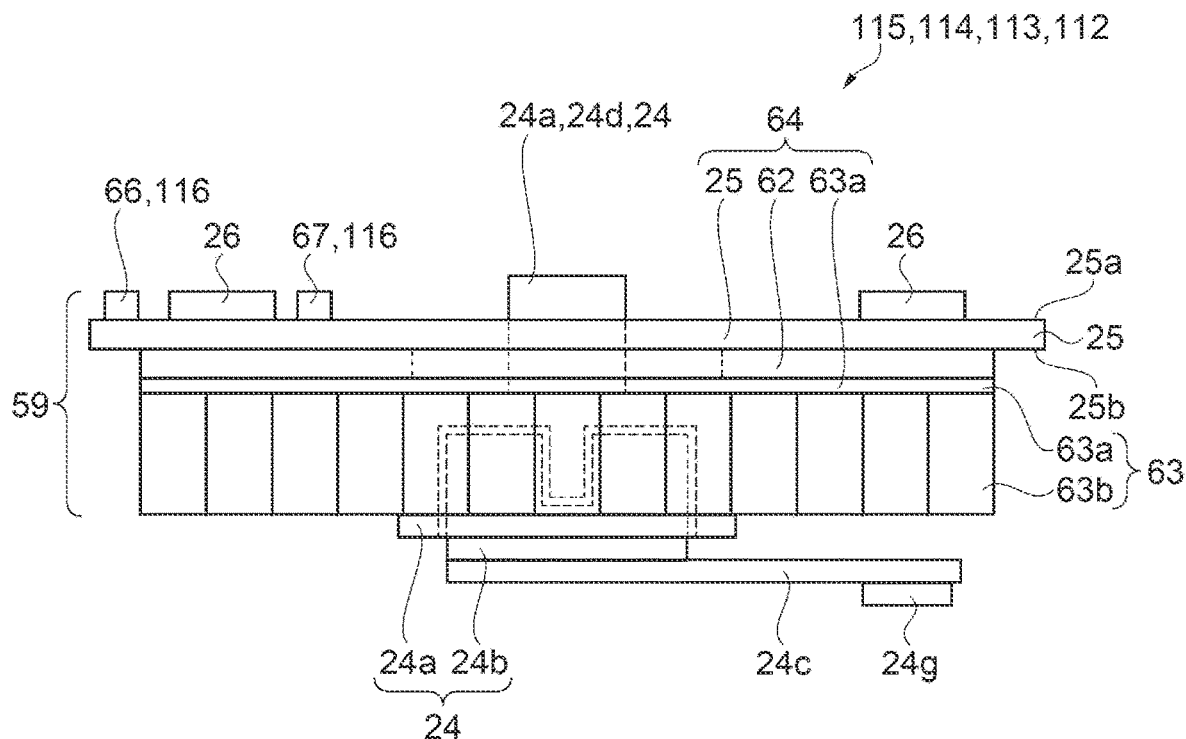
FIG. 14 is a diagrammatic side view showing the configuration of the phosphor wheel according to a sixth embodiment.

A wavelength converter 114 of a first illuminator 113 of a projector 112 includes a phosphor wheel 115, as shown in FIG. 14. The phosphor wheel 115 includes the wheel element 59, a balance corrector 116, and the motor 24. The balance corrector 116 includes the first balancer 66 and the second balancer 67. The first balancer 66 is disposed at the first surface 25a. The second balancer 67 is also disposed at the first surface 25a. The first balancer 66 is disposed on the outer side with respect to the phosphor 26. The second balancer 67 is disposed on the inner side with respect to the phosphor 26.

According to the configuration described above, since the first balancer 66, which is heavier, is disposed on the outer side, the weight of the first balancer 66 can be reduced. Since the second balancer 67 is disposed on the inner side, the accuracy of the fine adjustment can be increased. The balance of the phosphor wheel 115 can therefore be precisely adjusted with an increase in the weight thereof suppressed.

Seventh Embodiment

The present embodiment differs from the fourth embodiment in that the first balancer 66 and the second balancer 67 are differently disposed. The same configurations as those in the fourth embodiment have the same reference characters, and no redundant description of the same configurations will be made.

Figure 15:
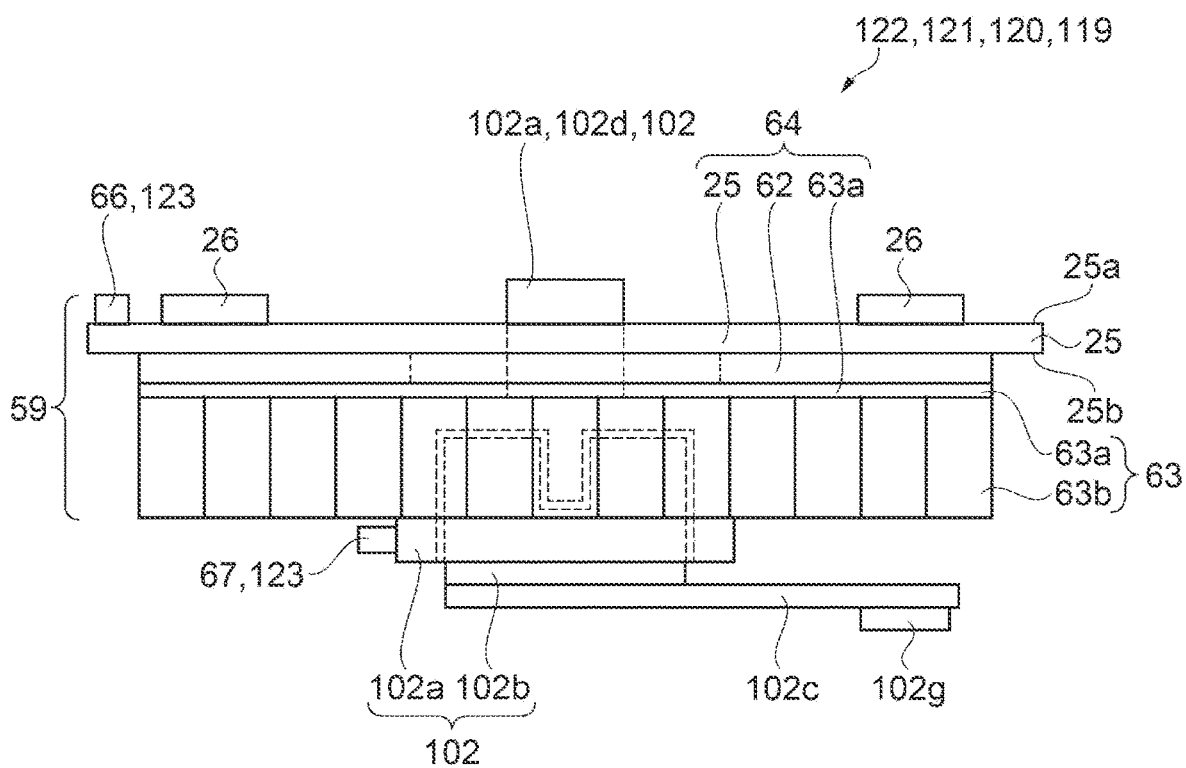
FIG. 15 is a diagrammatic side view showing the configuration of the phosphor wheel according to a seventh embodiment.

A wavelength converter 121 of a first illuminator 120 of a projector 119 includes a phosphor wheel 122, as shown in FIG. 15. The phosphor wheel 122 includes the wheel element 59, a balance corrector 123, and the motor 102. The balance corrector 123 includes the first balancer 66 and the second balancer 67. The first balancer 66 is disposed at the first surface 25a. The second balancer 67 is disposed at the outer circumferential surface of the rotor 102a. The first balancer 66 is disposed on the outer side with respect to the phosphor 26. The second balancer 67 is disposed on the inner side with respect to the phosphor 26.

According to the configuration described above, since the first balancer 66, which is heavier, is disposed on the outer side, the weight of the first balancer 66 can be reduced. Since the second balancer 67 is disposed on the inner side, the accuracy of the fine adjustment can be increased. The balance of the phosphor wheel 122 can therefore be precisely adjusted with an increase in the weight thereof suppressed.

Eighth Embodiment

The present embodiment differs from the second embodiment in that the second balancer 67 is differently disposed. The same configurations as those in the second embodiment have the same reference characters, and no redundant description of the same configurations will be made.

Figure 16:
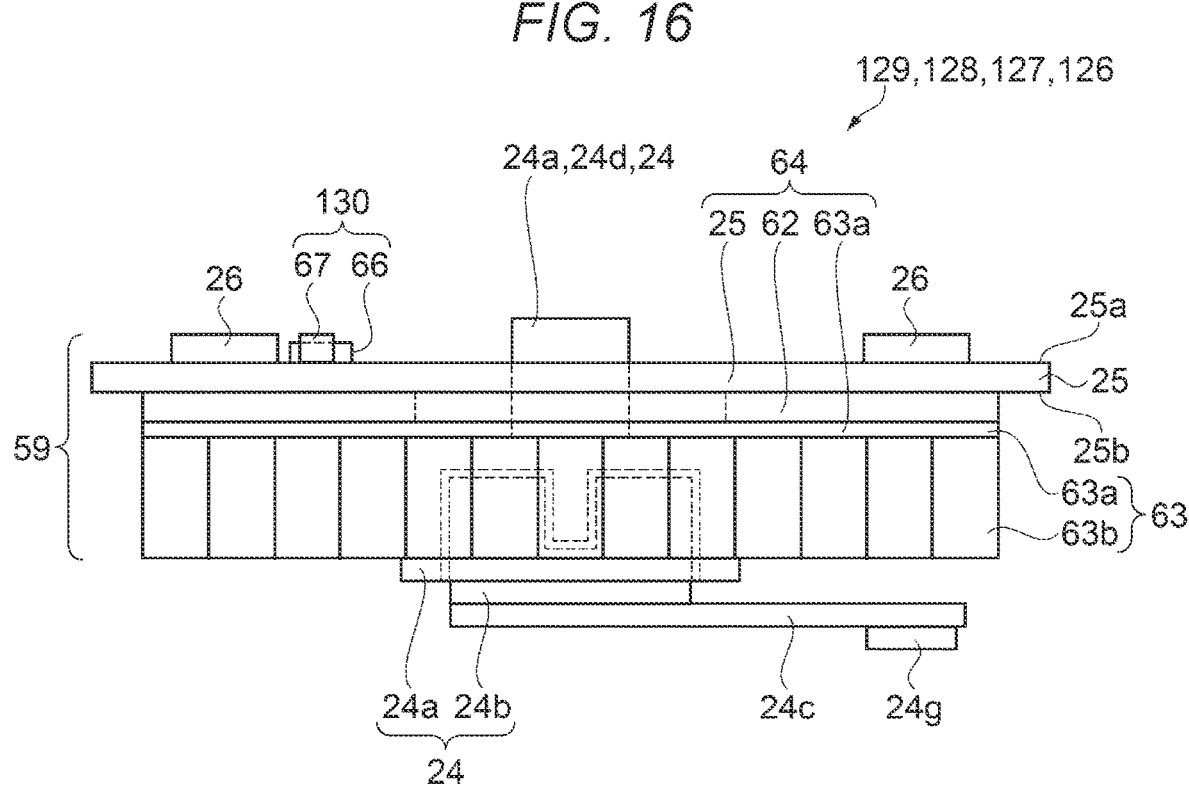
FIG. 16 is a diagrammatic side view showing the configuration of the phosphor wheel according to an eighth embodiment.

A wavelength converter 128 of a first illuminator 127 of a projector 126 includes a phosphor wheel 129, as shown in FIG. 16. The phosphor wheel 129 includes the wheel element 59, a balance corrector 130, and the motor 24. The balance corrector 130 includes the first balancer 66 and the second balancer 67. The first balancer 66 is disposed at the first surface 25a. The second balancer 67 is also disposed at the first surface 25a. The first balancer 66 and the second balancer 67 are disposed on the inner side with respect to the phosphor 26.

According to the configuration described above, the first balancer 66 and the second balancer 67 are disposed on the side facing the center, whereby the fine adjustment can be readily made. When the amount of unbalance is relatively small, the adjustment can be precisely made with a smaller number of balancers.

Ninth Embodiment

The present embodiment differs from the first embodiment in that holes are formed in the circular plate, and that the first and second balancers each have a protrusion to be inserted into any of the holes. The same configurations as those in the first embodiment have the same reference characters, and no redundant description of the same configurations will be made.

Figure 17:
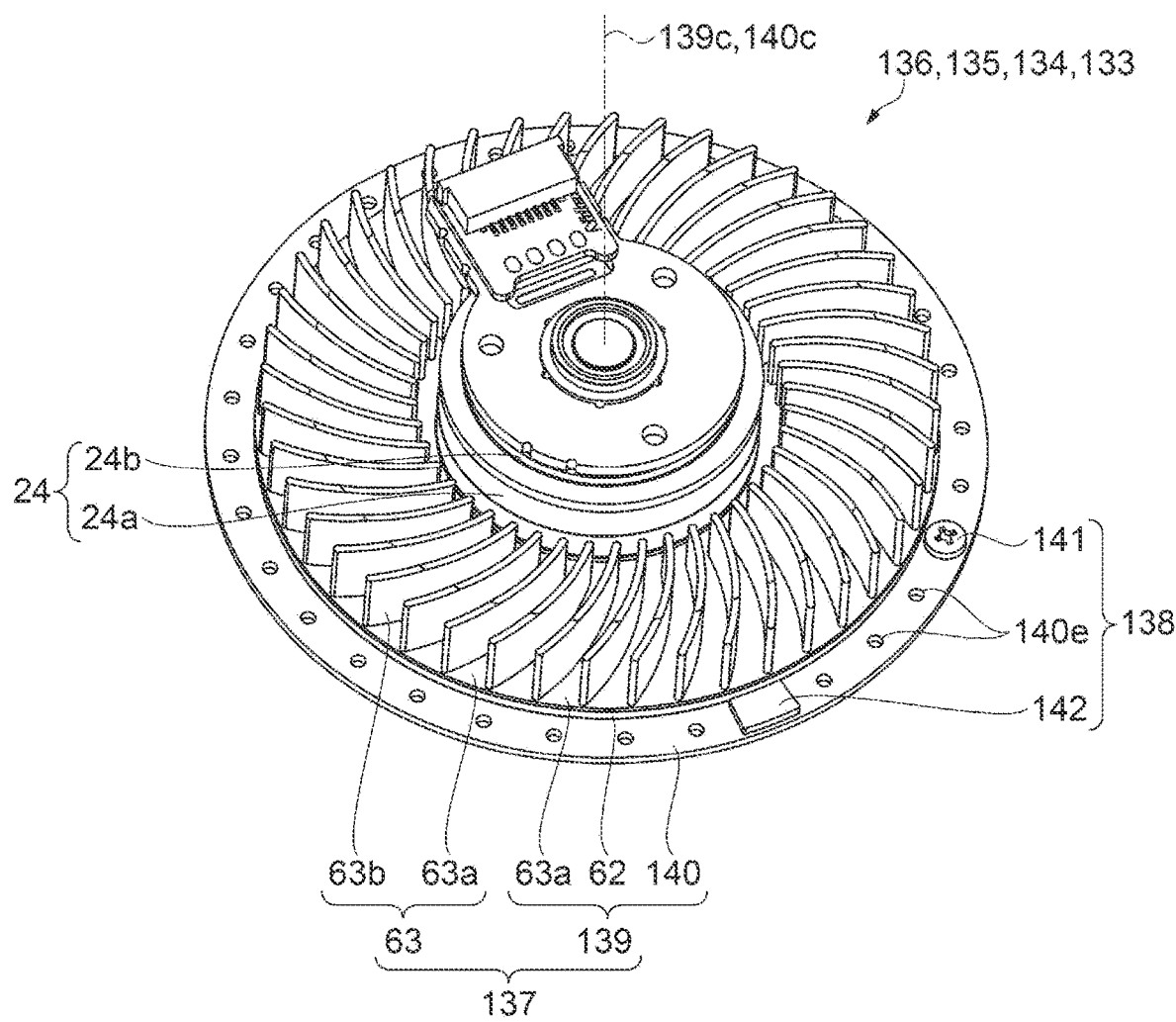
FIG. 17 is a schematic perspective view showing the configuration of the phosphor wheel according to a ninth embodiment.

A wavelength converter 135 of a first illuminator 134 of a projector 133 includes a phosphor wheel 136, as shown in FIG. 17. The phosphor wheel 136 includes a wheel element 137, a balance corrector 138, and the motor 24. The wheel element 137 includes a substrate 139. The substrate 139 includes the fixing plate 63a, the vapor chamber 62, and a circular plate 140. A center 139c of the substrate 139 and a center 140c of the circular plate 140 coincide with each other in the plan view of the substrate 139.

The circular plate 140 has positioning holes 140e, as a plurality of receivers, disposed at equal intervals on a circle around the center 140c of the circular plate 140. A first balancer 141 and a second balancer 142 are concentrically disposed around the center 139c of the substrate 139. The second balancer 142 is lighter than the first balancer 141. The balance corrector 138 has the plurality of positioning holes 140e, which position the first balancer 141 and the second balancer 142. The first balancer 141 and the second balancer 142 are each disposed in any of the plurality of positioning holes 140e.

Figure 18:
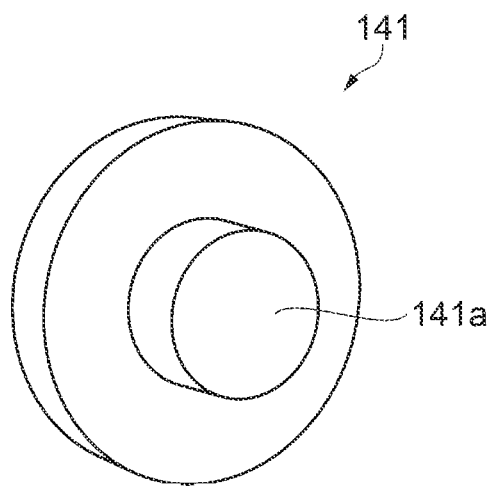
FIG. 18 is a schematic perspective view showing another first balancer.
Figure 19:
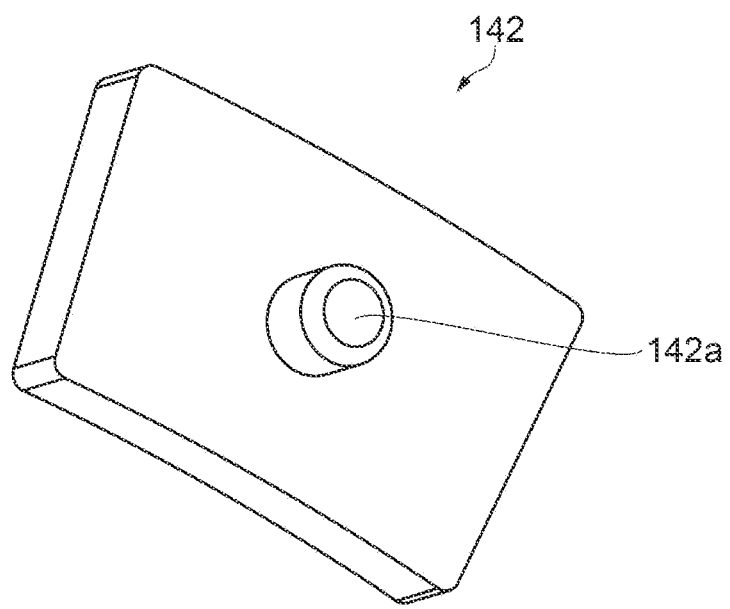
FIG. 19 is a schematic perspective view showing another second balancer.

The first balancer 141 has a protrusion 141a, as shown in FIG. 18. The protrusion 141a is inserted into any of the positioning holes 140e. The second balancer 142 has a protrusion 142a, as shown in FIG. 19. The protrusion 142a is inserted into any of the positioning holes 140e.

According to the configuration described above, the first balancer 141 and the second balancer 142 are each disposed in any of the positioning holes 140e provided in advance. The first balancer 141 and the second balancer 142 are readily placed in the positioning holes 140e, whereby the balance of the phosphor wheel 136 can be readily adjusted.

The positioning holes 140e are each formed of a hole, and the first balancer 141 and the second balancer 142 are each disposed in any of the holes. According to the configuration described above, the first balancer 141 and the second balancer 142 are each disposed in any of the positioning holes 140e. The first balancer 141 and the second balancer 142 are supported by the circular plate 140 even when centrifugal forces act on the first balancer 141 and the second balancer 142. The configuration described above can therefore prevent the first balancer 141 and the second balancer 142 from falling off the wheel element 137 and scattering.

The first balancer 141 and the second balancer 142 are glued and fixed to the circular plate 140. Instead, a female thread may be formed on each of the positioning holes 140e, and a male thread may be formed on the protrusion 141a of the first balancer 141. The first balancer 141 may be screwed and fixed to the circular plate 140. The first balancer 141 can be readily fixed to the circular plate 140.

As a variation of the ninth embodiment, the second balancer 142 may be made of a lightweight adhesive (having low specific gravity). In this case, the positioning holes 140e are used only by the first balancer 141. The first balancer 141 is made of a heavy metal (having high specific gravity). The second balancer 142 can be made of an UV curable adhesive. According to the configuration described above, the first balancer 141 disposed in any of the positioning holes 140e achieves rough rotational balance, and the second balancer 142 made of an adhesive determines the final rotational balance. It is difficult to achieve accurate rotational balance in some cases when the balancers are each disposed in a predetermined position or each have a predetermined weight. Accurate rotational balance can be achieved by using adhesive and changing the position where the adhesive is applied and the amount by which the adhesive is applied, the adhesive application positions being not necessarily a single position but a plurality of positions.

Tenth Embodiment

The present embodiment differs from the first embodiment in that recesses are formed in the circular plate, and that the first and second balancers are each placed in any of the recesses. The same configurations as those in the first embodiment have the same reference characters, and no redundant description of the same configurations will be made.

Figure 20:
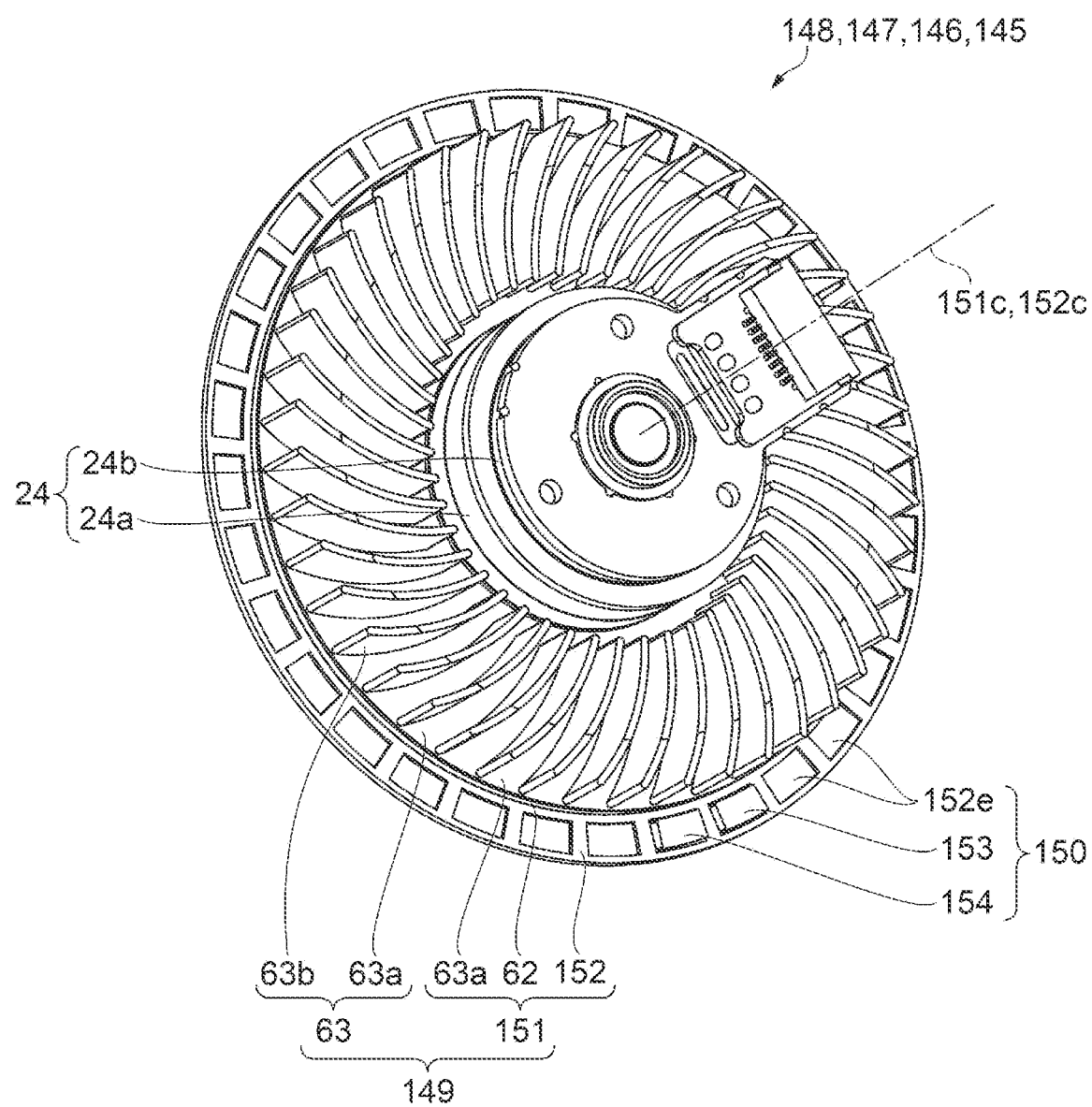
FIG. 20 is a schematic perspective view showing the configuration of the phosphor wheel according to a tenth embodiment.

A wavelength converter 147 of a first illuminator 146 of a projector 145 includes a phosphor wheel 148, as shown in FIG. 20. The phosphor wheel 148 includes a wheel element 149, a balance corrector 150, and the motor 24. The wheel element 149 includes a substrate 151. The substrate 151 includes the fixing plate 63a, the vapor chamber 62, and a circular plate 152. A center 151c of the substrate 151 and a center 152c of the circular plate 152 coincide with each other in the plan view of the substrate 151.

The circular plate 152 has positioning recesses 152e, as a plurality of receivers, disposed at equal intervals on a circle around the center 152c of the circular plate 152. A first balancer 153 and a second balancer 154 are concentrically disposed around the center 151c of the substrate 151. The second balancer 154 is lighter than the first balancer 153. The balance corrector 150 has the plurality of positioning recesses 152e, which position the first balancer 153 and the second balancer 154. The first balancer 153 and the second balancer 154 are each disposed in any of the plurality of positioning recesses 152e. The positioning recesses 152e are formed by press working.

According to the configuration described above, the first balancer 153 and the second balancer 154 are each disposed in any of the positioning recesses 152e provided in advance. The first balancer 153 and the second balancer 154 are readily placed in the positioning recesses 152e, whereby the balance of the phosphor wheel 148 can be readily adjusted.

The positioning recesses 152e are each formed of a recess, and the first balancer 153 and the second balancer 154 are each disposed in any of the recesses. According to the configuration described above, the first balancer 153 and the second balancer 154 are each disposed in any of the positioning recesses 152e. The first balancer 153 and the second balancer 154 are supported by the circular plate 152 even when centrifugal forces act on the first balancer 153 and the second balancer 154. The configuration described above can therefore prevent the first balancer 153 and the second balancer 154 from falling off the wheel element 149 and scattering. The first balancer 153 and the second balancer 154 may instead be placed in one of the positioning recesses 152e.

As a variation of the tenth embodiment, the second balancer 154 may be made of a lightweight adhesive (having low specific gravity). In this case, the positioning recesses 152e are used only by the first balancer 153. The first balancer 153 is made of a heavy metal (having high specific gravity). The second balancer 154 can be made of an UV curable adhesive. According to the configuration described above, the first balancer 153 disposed in any of the positioning recesses 152e achieves rough rotational balance, and the second balancer 154 made of an adhesive determines the final rotational balance. It is difficult to achieve accurate rotational balance in some cases when the balancers are each disposed in a predetermined position or each have a predetermined weight. Accurate rotational balance can be achieved by using adhesive and changing the position where the adhesive is applied and the amount by which the adhesive is applied, the adhesive application positions being not necessarily a single position but a plurality of positions.

Eleventh Embodiment

The present embodiment differs from the first embodiment in that the vapor chamber 62 also serves as the substrate. The same configurations as those in the first embodiment have the same reference characters, and no redundant description of the same configurations will be made.

Figure 21:
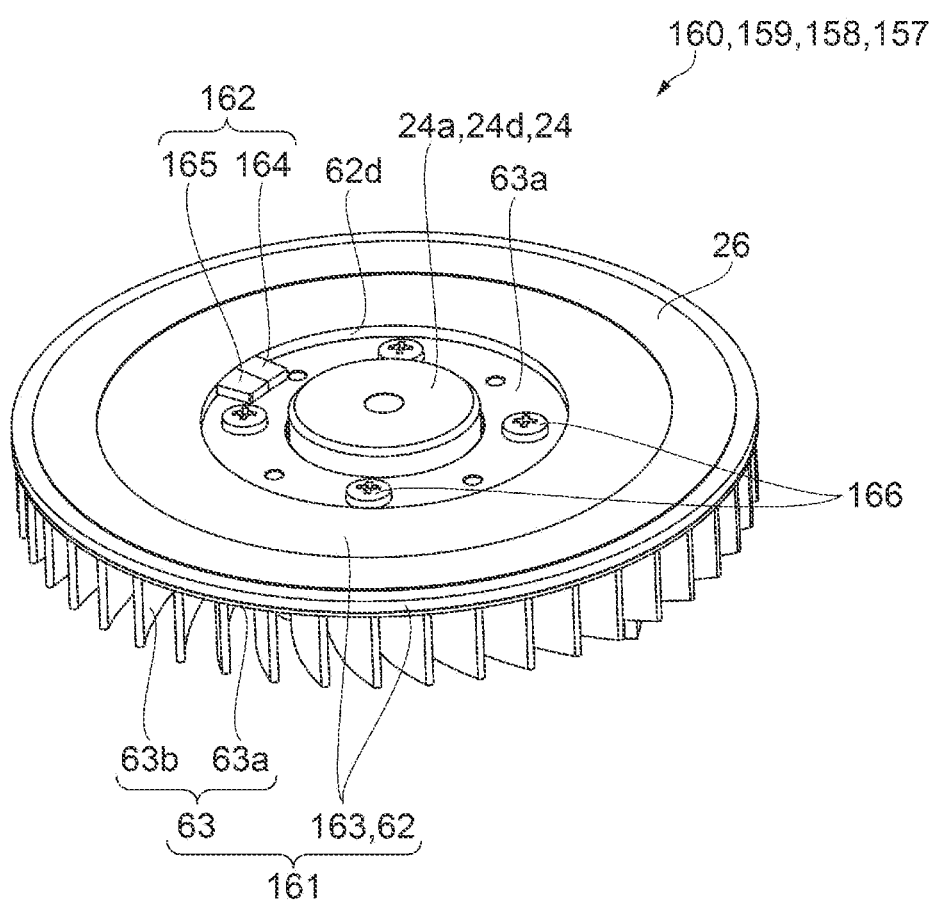
FIG. 21 is a schematic perspective view showing the configuration of the phosphor wheel according to an eleventh embodiment.
Figure 22:
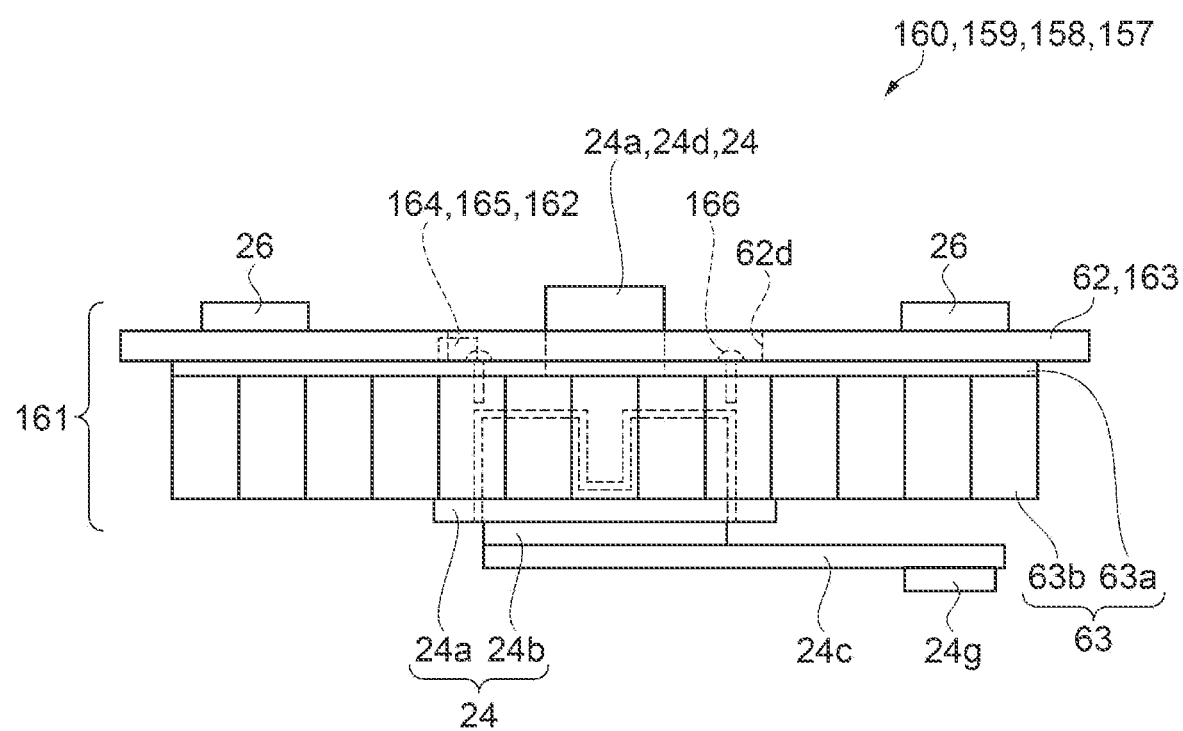
FIG. 22 is a diagrammatic side view showing the configuration of the phosphor wheel.

A wavelength converter 159 of a first illuminator 158 of a projector 157 includes a phosphor wheel 160, as shown in FIGS. 21 and 22. The phosphor wheel 160 includes a wheel element 161, a balance corrector 162, and the motor 24. The wheel element 161 includes a substrate 163. The substrate 163 is the vapor chamber 62.

According to the configuration described above, the heat generated by the phosphor 26 is received by the vapor chamber 62, and the heat vaporizes the operating fluid 69 in the vapor chamber 62, so that the heat diffuses across the vapor chamber 62. The diffused heat is dissipated via the fins 63b, so that the operating fluid 69 condenses, whereby the cooling efficiency at which the entire fins 63b dissipate the heat can be increased. Furthermore, the vapor chamber 62 also serves as a structural element as the substrate 163. The number of parts can therefore be reduced as compared with a case where the wheel element 161 includes a substrate that functions as the structural element in addition to the vapor chamber 62.

The fins 63b are fixed to the fixing plate 63a, which is fixed to the rotary shaft 24d of the motor 24, which rotates the wheel element 161. A first balancer 164 and a second balancer 165 of the balance corrector 162 are disposed at the fixing plate 63a.

According to the configuration described above, the balance corrector 162 is disposed at the fixing plate 63a. The balance corrector 162 can be disposed without suppression of the function of the vapor chamber 62.

The fixing plate 63a is fixed to the rotor 24a with screws 166. The vapor chamber 62 is glued and fixed to the fixing plate 63a. The second central through hole 62d opens through the vapor chamber 62. The second central through hole 62d exposes the fixing plate 63a. The first balancer 164 and the second balancer 165 are disposed so as to be in contact with the second central through hole 62d. The first balancer 164 and the second balancer 165 are glued and fixed to the fixing plate 63a. Therefore, when the wheel element 161 rotates, the vapor chamber 62 receives the centrifugal forces acting on the first balancer 164 and the second balancer 165. The configuration described above can therefore prevent the first balancer 164 and the second balancer 165 from falling off the wheel element 161 and scattering. A plate for fixing the wheel element 161 to the motor 24 may be provided separately from the fixing plate 63a. Instead, the vapor chamber 62 and the vane wheel 63 may be integrated into a single structure. Still instead, the vapor chamber 62 and a motor fixing plate that fixes the vapor chamber 62 to the motor 24 may be integrated with each other. The vane wheel 63 may be glued and fixed to the motor fixing plate.

Twelfth Embodiment

The phosphor wheel according to an aspect of the present disclosure may have the configuration below.

The phosphor wheel according to an aspect of the present disclosure includes a wheel element including a disk-shaped substrate having a first surface and a second surface opposite from the first surface, an annular phosphor disposed at the first surface on a circle around the center of the substrate, and a plurality of fins disposed at the second surface and extending outward from the side facing the center of the substrate, and a balance corrector that corrects nonuniformity of the rotational balance of the wheel element.

The balance corrector includes a first balancer and a second balancer that is lighter than the first balancer.

The configuration described above uses two types of balancers having different weights. The first balancer, which is heavier, achieves roughly balanced rotation. The second balancer, which is lighter, is then used to make fine adjustment of the rotational balance. When the amount of unbalance is large, the first balancer can reduce the amount of unbalance. The second balancer allows fine adjustment. The amount of unbalance can therefore be readily adjusted irrespective of how much the amount of unbalance is.

The annular phosphor in the present disclosure includes a phosphor that is divided into a plurality of portions arranged in an annular shape.

Thirteenth Embodiment

The phosphor wheel according to the aspect of the present disclosure may employ a configuration in which the first and second balancers are disposed between the outer circumference of the substrate and the outer circumference of the plurality of fins.

According to the configuration described above, the first and second balancers are disposed on the side facing the outer circumference of the substrate. The arrangement described above allows the adjustment to be made by lighter balancers than in a case where the first and second balancers are disposed on the side facing the center of the substrate. An increase in the weight of the phosphor wheel can therefore be suppressed.

Fourteenth Embodiment

The phosphor wheel according to the aspect of the present disclosure may employ a configuration in which the first balancer is disposed on the inner side with respect to the phosphor and the second balancer is disposed on the outer side with respect to the phosphor.

According to the configuration described above, the first balancer, which is heavier, is disposed on the inner side. The second balancer, which is lighter, is disposed on the outer side. The first balancer, which has a larger effect on the rotational balance, has a reduced effect. The second balancer, which has a smaller effect on the rotational balance, has an increased effect. The coarse adjustment using the first balancer and the fine adjustment using the second balancer can therefore both be readily made.

Fifteenth Embodiment

The phosphor wheel according to the aspect of the present disclosure may employ a configuration in which the first balancer is disposed on the outer side with respect to the phosphor and the second balancer is disposed on the inner side with respect to the phosphor.

According to the configuration described above, since the first balancer, which is heavier, is disposed on the outer side, the weight of the first balancer can be reduced. Since the second balancer is disposed on the inner side, the accuracy of the fine adjustment can be increased. The balance of the phosphor wheel can therefore be precisely adjusted with an increase in the weight thereof suppressed.

Sixteenth Embodiment

The phosphor wheel according to the aspect of the present disclosure may employ a configuration in which the first and second balancers are disposed on the inner side with respect to the phosphor.

According to the configuration described above, the first and second balancers are disposed on the side facing the center, whereby the fine adjustment can be readily made. When the amount of unbalance is relatively small, the adjustment can be precisely made with a smaller number of balancers.

Seventeenth Embodiment

In the phosphor wheel according to the aspect of the present disclosure, the first and second balancers are concentrically disposed around the center of the substrate. The balance corrector may employ a configuration in which the balance corrector includes a plurality of receivers that position the first and second balancers and the first and second balancers are each disposed in any of the plurality of receivers.

According to the configuration described above, the first and second balancers are each disposed in any of the receivers provided in advance. The first and second balancers are each readily placed in any of the receivers, whereby the balance of the phosphor wheel can be readily adjusted.

Eighteenth Embodiment

The phosphor wheel according to the aspect of the present disclosure may employ a configuration in which the receivers have recesses or holes and the first and second balancers are each disposed in any of the recesses or the holes.

According to the configuration described above, the first and second balancers are each disposed in any of the recesses or the holes. The first and second balancers can be supported by the substrate even when centrifugal forces act on the first and second balancers. The configuration described above can therefore prevent the first and second balancers from falling off the wheel element and scattering.

Nineteenth Embodiment

The phosphor wheel according to the aspect of the present disclosure may employ a configuration in which the first and second balancers are layered on each other.

According to the configuration described above, the first and second balancers can be disposed at the same location. Weights can be disposed at a location where it is desired to eliminate rotational unbalance, whereby the adjustment can be readily made.

In the phosphor wheel according to the aspect of the present disclosure, the plurality of fins are fixed to a fixing plate, and a vapor chamber is disposed between the substrate and the fixing plate. The vapor chamber includes a container section having a cavity provided therein and an operating fluid encapsulated in the cavity. The operating fluid may be configured to vaporize from the liquid phase to the gas phase due to the heat generated by the phosphor and condense from the gas phase to the liquid phase due to the dissipation of the heat via the fins.

According to the configuration described above, the heat generated by the phosphor is received by the vapor chamber via the substrate, and the heat vaporizes the operating fluid in the vapor chamber, so that the heat diffuses in the vapor chamber. The diffused heat is dissipated via the fins, so that the operating fluid condenses, whereby the cooling efficiency at which the entire fins dissipate the heat can be increased.

Twentieth Embodiment

In the phosphor wheel according to the aspect of the present disclosure, the substrate is a vapor chamber. The vapor chamber includes a container section having a cavity provided therein and an operating fluid encapsulated in the cavity. The operating fluid may be configured to vaporize from the liquid phase to the gas phase due to the heat generated by the phosphor and condense from the gas phase to the liquid phase due to the dissipation of the heat via the fins.

According to the configuration described above, the heat generated by the phosphor is received by the vapor chamber, which is the substrate, and the heat vaporizes the operating fluid in the vapor chamber, so that the heat diffuses in the vapor chamber. The diffused heat is dissipated via the fins, so that the operating fluid condenses, whereby the cooling efficiency at which the entire fins dissipate the heat can be increased. Furthermore, the vapor chamber serves as a structural element as the substrate. The number of parts can therefore be reduced as compared with a case where the wheel element includes a substrate that functions as the structural element in addition to the vapor chamber.

Twenty First Embodiment

The phosphor wheel according to the aspect of the present disclosure may employ a configuration in which the fins are fixed to a fixing plate fixed to the rotary shaft of a motor that rotates the wheel element and the balance corrector is disposed at the fixing plate.

According to the configuration described above, the balance corrector is disposed at the fixing plate. The balance corrector can be disposed without suppression of the function of the vapor chamber.

Twenty Second Embodiment

A light source apparatus according to an aspect of the present disclosure includes a motor that rotates the phosphor wheel described above and an excitation light source that causes excitation light to be incident on the phosphor wheel.

According to the configuration described above, the light source apparatus includes the phosphor wheel described above. The phosphor wheel can be readily adjusted irrespective of how much the amount of unbalance is. The light source apparatus can therefore be a light source apparatus including the phosphor wheel that can be readily adjusted irrespective of how much the amount of unbalance is.

Twenty Third Embodiment

A projector according to an aspect of the present disclosure includes the light source apparatus described above, a light modulation device that modulates illumination light outputted from the light source apparatus into image light, and a projection system that projects the image light outputted from the light modulation device.

According to the configuration described above, the projector includes the phosphor wheel described above. The phosphor wheel described above can be readily adjusted irrespective of how much the amount of unbalance is. The projector can therefore be a projector including the phosphor wheel that can be readily adjusted irrespective of how much the amount of unbalance is.

What is claimed is:

1. A phosphor wheel comprising:
    a disk-shaped substrate having a first surface and a second surface opposite from the first surface,
    an annular phosphor disposed at the first surface on a circle around a center of the substrate,
    a plurality of fins disposed at the second surface and extending outward from a side facing the center of the substrate;
    a first balancer; and
    a second balancer that is lighter than the first balancer,
    wherein one of the first balancer and the second balancer is disposed between an outer circumference of the substrate and an outer circumference of the plurality of fins.

2. The phosphor wheel according to claim 1,
    wherein the first and second balancers are concentrically disposed around the center of the substrate,
    the balance corrector includes a plurality of receivers that position the first and second balancers, and
    the first and second balancers are each disposed in any of the plurality of receivers.

3. The phosphor wheel according to claim 2,
    wherein the receivers have recesses or holes, and the first and second balancers are each disposed in any of the recesses or the holes.

4. The phosphor wheel according to claim 1,
    wherein the first and second balancers are layered on each other.

5. The phosphor wheel according to claim 1,
    wherein the plurality of fins are fixed to a fixing plate,
    the phosphor is placed at a circular plate that is part of the substrate,
    a vapor chamber is disposed between the circular plate and the fixing plate,
    the vapor chamber includes a container section having a cavity provided therein and an operating fluid encapsulated in the cavity, and
    the operating fluid vaporizes from a liquid phase to a gas phase due to heat generated by the phosphor and condenses from the gas phase to the liquid phase due to dissipation of the heat via the fins.

6. The phosphor wheel according to claim 1,
    wherein the substrate is a vapor chamber,
    the vapor chamber includes a container section having a cavity provided therein and an operating fluid encapsulated in the cavity, and
    the operating fluid vaporizes from a liquid phase to a gas phase due to heat generated by the phosphor and condenses from the gas phase to the liquid phase due to dissipation of the heat via the fins.

7. The phosphor wheel according to claim 6,
    wherein the fins are fixed to a fixing plate fixed to a rotary shaft of a motor, and
    a balance corrector is disposed at the fixing plate.

8. A light source apparatus comprising:

the phosphor wheel according to claim 1;

a motor that rotates the phosphor wheel; and an excitation light source that causes excitation light to be incident on the phosphor wheel.

9. A projector comprising:

the light source apparatus according to claim 8;

a light modulation device that modulates illumination light outputted from the light source apparatus into image light; and a projection system that projects the image light outputted from the light modulation device.

10. A phosphor wheel comprising:

a disk-shaped substrate having a first surface and a second surface opposite from the first surface, an annular phosphor disposed at the first surface on a circle around a center of the substrate, a plurality of fins disposed at the second surface and extending outward from a side facing the center of the substrate, a first balancer; and a second balancer that is lighter than the first balancer, wherein one of the first balancer or the second balancer is disposed on an inner side with respect to the phosphor, the other of the first balancer or the second balancer is disposed on an outer side with respect to the phosphor.

11. A phosphor wheel comprising:

a disk-shaped substrate having a first surface and a second surface opposite from the first surface, an annular phosphor disposed at the first surface on a circle around a center of the substrate, a plurality of fins disposed at the second surface and extending outward from a side facing the center of the substrate, a first balancer; and a second balancer that is lighter than the first balancer wherein either the first balancer or the second balancer is disposed between an outer circumference of the substrate and an outer circumference of the plurality of fins, the first and second balancers are layered on each other, and the first and second balancers are independent objects.

* * * * *